United States Patent
Laird et al.

(10) Patent No.: US 11,804,226 B2
(45) Date of Patent: Oct. 31, 2023

(54) SYSTEM AND METHOD FOR UNDERSTANDING AND EXPLAINING SPOKEN INTERACTIONS USING SPEECH ACOUSTIC AND LINGUISTIC MARKERS

(71) Applicant: Lexiqal Ltd, London (GB)

(72) Inventors: James Laird, London (GB); Nigel Cannings, London (GB); Cornelius Patrick Glackin, London (GB); Julie Ann Wall, London (GB); Nikesh Bajaj, London (GB)

(73) Assignee: Lexiqal Ltd, London (GB)

( * ) Notice: Subject to any disclaimer, the term of this patent is extended or adjusted under 35 U.S.C. 154(b) by 105 days.

(21) Appl. No.: 17/308,222

(22) Filed: May 5, 2021

(65) Prior Publication Data

US 2021/0407514 A1    Dec. 30, 2021

(30) Foreign Application Priority Data

Jun. 26, 2020 (GB) ..................... 2009809

(51) Int. Cl.
*G10L 15/26* (2006.01)
*G10L 15/183* (2013.01)
(Continued)

(52) U.S. Cl.
CPC ............ *G10L 15/26* (2013.01); *G10L 15/183* (2013.01); *G10L 15/20* (2013.01); *G10L 15/32* (2013.01)

(58) Field of Classification Search
CPC ....... G10L 15/26; G10L 15/183; G10L 15/20; G10L 15/32; G10L 17/26; G06F 40/20
See application file for complete search history.

(56) References Cited

U.S. PATENT DOCUMENTS 9,116,877 B2 *    8/2015   Chandramouli ...... G06F 40/216
2007/0010993 A1 *   1/2007   Bachenko ............. G06F 40/253
                                                   704/9
(Continued)

FOREIGN PATENT DOCUMENTS

WO    WO 2020/039250 A1    2/2020

OTHER PUBLICATIONS

Graciarena, Martin, et al. "Combining prosodic lexical and cepstral systems for deceptive speech detection." 2006 IEEE International Conference on Acoustics Speech and Signal Processing Proceedings, 2006, pp. 1033-1036 (Year: 2006).*

(Continued)

*Primary Examiner* — Jesse S Pullias
*Assistant Examiner* — Michael C. Lee
(74) *Attorney, Agent, or Firm* — Bookoff McAndrews, PLLC

(57) ABSTRACT

A method includes providing audio signals of an interaction between a plurality of human speakers, the speakers speaking into electronic devices to record the audio signals. The audio signals, which are optionally combined, include agent audio and subject audio. The method further includes automatically processing the audio signals to generate a speaker separated natural language transcript of the interaction from the audio signals. For each identified question, a subject response is identified. From the agent text, it is determined whether the question asked by the at least one agent is an open question or a closed question. A decision engine is used to determine the veracity of the subject response and the (Continued)

subject response is flagged if the indicia of the likelihood of deception in the subject response exceeds a predetermined value.

17 Claims, 5 Drawing Sheets

(51) Int. Cl.
  *G10L 15/20* (2006.01)
  *G10L 15/32* (2013.01)

(56) References Cited

U.S. PATENT DOCUMENTS

| | | |
|---|---|---|
| 2012/0262296 A1 | 10/2012 | Bezar |
| 2018/0218082 A1* | 8/2018 | Mitra ................ G06F 16/958 |
| 2018/0260533 A1 | 9/2018 | Tegreene et al. |
| 2019/0370412 A1* | 12/2019 | Hammontree ........ G06F 40/211 |
| 2020/0065394 A1* | 2/2020 | Calderon ............. G06V 40/174 |
| 2020/0349950 A1* | 11/2020 | Yoshioka ............. G10L 15/083 |
| 2022/0199094 A1* | 6/2022 | El Shafey ............. G10L 15/26 |

OTHER PUBLICATIONS

Bachenko, Joan, et al. "Verification and implementation of language-based deception indicators in civil and criminal narratives." Proceedings of the 22nd International Conference on Computational Linguistics. 2008, pp. 41-48 (Year: 2008).*

Burns, Mary B., et al. "Automated deception detection of 911 call transcripts." Security Informatics (2014) pp. 1-9 (Year: 2014).*

Levitan, Sarah Ita, et al. "Acoustic-Prosodic Indicators of Deception and Trust in Interview Dialogues." Interspeech. 2018. pp. 416-420 (Year: 2018).*

Gröndahl, Tommi, et al. "Text analysis in adversarial settings: Does deception leave a stylistic trace?." ACM Computing Surveys (2019): pp. 1-36 (Year: 2019).*

"Capitalization Rules", available at https://web.archive.org/web/20200221225545/https://www.grammarbook.com/punctuation/capital.asp (available as of Feb. 21, 2020) (Year: 2020).*

Search Report issued by the UK Intellectual Property Office in corresponding GB application GB2009809.1 dated Dec. 24, 2020.

* cited by examiner mm no mhm I did excellent on that um I think one help being serving in the uh being in the marine corps and you know serving in a government position and working for embassies and whatnot you start getting a view of national structure and and whatnot and also it was just an interest of mine growing up like american government politics um and even now um you know I really stay up on things like in The Economist and political science things that are going on in politics so I think that that plays into it plays a big part yes yes I am um as far as I know yes I vote in like in the mayoral elections congressional presidential elections yes f I guess for Blumberg's election yes I'm sorry um I s I pay attention like from at a mayoral level I I'm not really all as familiar with like my councilmen although we just had an event with councilman Perkins that uh it was an event that I put on where we had him as a guest and former Mayor Dinkins so I stay savvy to to what's going on in New York City and what the relevant issues are I don't have specific knowledge on you know different districts or boroughs necessarily mhm uh define fair uh yeah I think that's fair I've read a long time ago I haven't reread it recently no um w that's a very good question I'm not I'm not sure if I have I th as far as I know I have but it was a long time ago so maybe it was just you know like the

*FIG. 3*

| | MARKED UP TEXT | SENTIMENT |
|---|---|---|
| (A) | I like this movie, absolutely brilliant | 0.9142 |
| (B) | I hate this movie, absolutely trash | 0.1397 |
| (C) | i wish i could say that the movie was good, but it's terrible | 0.3414 |
| (D) | As a United fan I hate to say it but Salah is a great striker, I would kill to have him in my team. | 0.7792 |
| (E) | an incomprehensible script when it shouldn't have been dependent on a rather flaky voice over the animation however show real talent quite visually impressive | 0.6559 |
| (F) | this is by far the worst non english horror movie I've seen the acting is wooden the dialogues are simply stupid and the story is totally brain-dead its not even scary 2 out of 10 from me | 0.0009 |
| (G) | I have no way of knowing exactly how much is exaggeration, but I've got a creepy feeling that the film is closer to the mark than I want to believe | 0.5538 |
| (H) | fun movie great for the kids they found it very entertaining somewhat predictable but there are a few surprises great movie to watch if youre looking for something just to entertain dont expect to be seeing a classic | 0.9689 |
| (I) | the stuff dreams are made of a complete retelling of the play as a dream of vengeance will baffle purists but will delight the open minded a superb effort great cinematography acting and script 11 stars | 0.9151 |
| (J) | felix in hollywood is a great film the version i viewed was very well restored which is sometimes a problem with these silent era animated films it has some of hollywoods most famous stars making cameo animated appearances a must for any silent film or animation enthusiast | 0.9615 |

*FIG. 5*

SYSTEM AND METHOD FOR UNDERSTANDING AND EXPLAINING SPOKEN INTERACTIONS USING SPEECH ACOUSTIC AND LINGUISTIC MARKERS

CROSS-REFERENCE TO RELATED APPLICATION

This application claims the benefit of priority under 35 U.S.C. § 119 to GB Patent Application No. 2009809.1, filed on Jun. 26, 2020, which is incorporated by reference herein in its entirety.

BACKGROUND

Verbal communication is a primary means of conveying information and a recipient may be motivated to carry out actions as a consequence. In many situations the recipient has to make a value judgement as to the veracity of any request. However, in stressful and time pressured situations human cognition can be particularly flawed.

In addition it is not uncommon that a subject conveying information, such as a request, to a recipient may intentionally try and deceive.

The above situations are particularly critical for emergency service providers where a limited resource must be allocated under time pressure to a plurality of demands.

There is therefore a need to enhance and support human perception so as to optimise the use of voice communications. In particular, human perception can be flawed and cues derived by a human listener can be misinterpreted and the required action counter intuitive. There is therefore need to bring to bear the power of automated processing to enhance and support the human user or to initiate tasks in advance or in preparation for user intervention so as to speed up or optimise human responses.

As context, humans have a vocabulary of a finite number of words, in natural language generally between 25-35,000 dependent upon intelligence. When conversing we need to select the words to use, decide which portions of information we want to report and order this grammatically, responding in a very short period of time. A lie will interrupt this process as it creates an additional cognitive load. A subject with guilty knowledge will choose to edit out any incriminating information. As the pressure is increased on the subject via interviewing, the subject may have to think several steps ahead to make the "story" sound convincing so that it ties together, and the subject will inadvertently allow words to leak out due to the time constraint, revealing more information to work with and follow up on. Evidence of this leakage can be discerned by analysing what people say and how they say it.

What follows is a review of the academic literature concerning verbal deception:

Disfluencies

In a review of US 911 homicide calls, Adams and Harpster (Adams and Harpster 2008) commented that of all the callers who displayed speech disfluencies, all but one was guilty of the homicide. Similarly, an observable number of speech disfluencies were also identified on the high-profile interview transcription of convicted murderer Jodi Arias (Choudhury 2014). The findings showed that Arias, with guilty knowledge, made an observable number of speech disfluencies. It is claimed, deceivers use 'um' and 'uh' more often than truth tellers (Humpherys 2010). The causal mechanism that increases disfluencies in deceptive speech appears to be cognitive load.

Explainers

Sapir (Sapir 1987) claims that a deceptive writer is likely to include information that appears, to the reader, to deviate from the logical progression of events they are being asked to describe. The information provided might not seem relevant: the rationale behind the actions is offered in addition to the description of them. The use of terms such as 'because', 'since', 'so that' are all common indicators of out of sequence information.

According to Hyatt (Hyatt 2015), any words that explain rather than report, should be highlighted as being sensitive. 'So, since, therefore, because and hence' are all highlighted as the subject is no longer saying what happened but saying why something happened. This is sensitive. When asked to tell us 'what happened?' and someone says or writes 'why' something happened, it is very sensitive information. It indicates that the subject is worried about being asked 'well, why did you . . . ?' so they anticipate being asked and answer it beforehand. In the analysis of hand-written statements (statement analysis), the words 'because' (or 'so, since, therefore etc.') is given the colour coding of blue as being the highest level of sensitivity in a statement. When there are two or more blues, we often have solved the statement or crime. The reason for this is that the subject, when reporting what happened, has a need to explain why they did something and highlights specific areas of extreme sensitivity. When more than one is found in close proximity, this indicates a highly sensitive part of the interaction that should be targeted for further questioning.

A typical theft statement: "Went out to my truck to smoke. Took my bag with me because it was not locked up and my wallet with cash was in my bag so I felt better leaving with it or putting it in my locked truck." Hyatt (Hyatt 2015) recounts that an individual was suspected of having stolen a missing iPad. When challenged, the above was the most sensitive area. The person admitted the theft and with follow up questions revealed that they had hidden the stolen iPad in the locked truck.

According to Schaffer (Schaffer 1999), when we ask a person a question, 'what happened?' we expect information that answers this question. Anytime a person fails to answer this question, it is very important. There are a number of ways this can happen without the person realising it. This information is extraneous or beyond the boundaries of the question and statement. Many times, this information appears to be trivial and insignificant to us, but the writer (in a written statement) put it there because it was important to them and they wanted us to know. The reason for explaining why something happened is highly sensitive. The reason for explaining why something did not happen is hyper sensitive.

Findings suggest that there may be a speech analogue to what psychologists who study behavioural and facial cues to deception call hotspots (Enos, et al. 2007), events in which relevant emotion is particularly observable and can thus be more easily detected. Such findings can guide the design of future data collection paradigms and real-world approaches, since interviewing techniques might be optimized to induce the subject to produce critical segments.

Much of the early analysis of statements is based upon hand-written statements. One of the pioneering techniques is the Scientific Content Analysis Technique (SCAN). The hand-written statement is painstakingly analysed to extract various criterion (Smith 2001). Each criterion was graded for each time it appeared (but only graded once even if it appeared several times in one statement) in separate statements. A value of 0 was given if the criterion was absent and a value of 1 was given if it was present. It noted the higher the score, the greater the chance of deception. Generally, 8 of the 13 main SCAN criteria are indicators of deception.

Hedging

Statement analysis applied to the transcripts of earnings calls Q&As found that hedging and uncertainty were highest during the unscripted Q&A on Fraudulent Topics (Burgoon, et al. 2016). Hedging and uncertainty were lowest during prepared remarks on fraudulent topics. Research concluded this is due to compensate for the hedging in unscripted answers by adding certainty language in the prepared section so as to appear confident.

It has been reported elsewhere (Humpherys 2010), that in spontaneous speech deceivers had higher mean rates of hedging than truth tellers although the difference varies depending on the context of the question. Smith (Smith 2001) hypothesises that a deceptive person is likely to demonstrate a lack of conviction regarding his/her version of events. They may avoid providing information that might implicate themselves by deliberately being vague (e.g. I believe, sort of).

Repetition

It has been proved previously that repetitions are significantly and positively correlated with deception (DePaulo, et al. 2003). In general, support was found across studies, e.g. (Hirschberg 2008), for claims that a deceiver's productions are less plausible and fluent than those of truth-tellers in a number of categories including repetition of words and phrases more often than truth-tellers. People who do not tell the truth tend to repeat words or phrases gaining time to think of a reasonable answer. It is supposed that the unprepared lie produces in the liar more emotional arousal and less cognitive efficiency (Anolli and Ciceri 1997). As a result, more leakage cues appear. These take the form of a repetition of words amongst others. Furthermore, deceptive accounts include more phrase and word repetitions (Hauch, et al. 2015). Hence, repetitions may be useful indicators of deception (Nunamaker, et al. 2012), Hyatt (Hyatt 2015) explains: anything that is repeated is sensitive to the subject. The repetition is noted, and the question is asked, "why would this word or phrase be sensitive to the subject?" The statement is not reality, it is the subject's version of reality.

Memory Loss

A lack of memory about an incident demonstrates a lack of commitment on the part of the writer (Sapir 1987). To avoid providing information, the writer typically writes, "I don't remember" or "I don't recall." Lack of memory is also demonstrated in statements such as "I think, "I believe" "Kind of," or "I'm not sure." A lack of memory signals the possibility of deception. In fact, according to Adams and Jarvis (Adams and Jarvis 2006), a statement such as 'I'm not sure or I don't remember where it was that we paid the bill' indicates that the writer may know the information and chose not to reveal it.

Negation

Deceivers attempt to suppress verbal responses by using more negation and assent words (Burns and Moffitt 2014). Less well-rehearsed deceivers are said to produce more negations (Hirschberg 2008). Deceptive narratives contain higher spontaneous negation ratios than do truthful narratives (Schafer 2007). A spontaneous negation occurs when a writer, in response to an open-ended question, writes down an action that he or she did not do.

Temporal Lacunae

Deceptive people may use words or phrases that indicate they have skipped over something (McClish 2001). i.e. "we drove to the store and got some beer. Later on, we went to Mike's house." This phenomenon is referred to as Temporal Lacunae. When an area of temporal lacunae is found it should be flagged and the interview concentrated around this area (Hyatt 2015).

Initially claimed by Suiter (Suiter 2001) and later reported by Shafer (Schafer 2007), it was also found that the use of the word 'when' was prevalent in deceptive statements, indicating a temporal lacuna. Other words that indicated temporal lacunae include 'after that', 'afterwards', 'at that time', 'at that point', 'later on', 'by the time', 'and all of a sudden'. However, Suiter (Suiter 2001) cautions that a temporal lacuna, in and of itself does not indicate deception.

A connecting phrase transitions one part or sentence of the statement to another (Schaffer 1999). Some are insignificant but several are indicators that the subject intentionally removed important information from the statement and is a strong indication that deception is present.

i.e. " . . . so, we sat and discussed it. After we discussed it, I didn't feel so angry toward him."

Deceptive individuals only lie if they have to. When they get to the point of the temporal lacunae, after telling the truth, they omit the incriminating information.

Uncertainty

Uncertainty can be discerned from spoken interactions by measuring the use and absence of equivocation terms. These are defined as terms that may reveal uncertainty through the avoidance of a definitive answer (Wade 1993). Here it is noted that communicators who precede text with words such as 'maybe' or 'kind of' are not fully committed to their accounts. In general, it has been noted that deceptive subjects use non immediate and uncertain language in the form of less self-reference and more group references (Zhou, et al. 2004).

Regarding hedging and uncertainty, the degree of prior preparation is key. During unscripted parts of a Q&A on fraudulent topics, hedging and uncertainty were at their highest (Burgoon, et al. 2016). Conversely, the authors found that hedging and uncertainty were at their lowest during prepared remarks on fraudulent topics. Research concluded this is due to compensate for the hedging in unscripted answers by adding certainty language in the prepared section so as to appear confident.

Sentiment

Regarding sentiment and its sensitivity in interactions, prior research in the area has focussed on earnings calls. It should be noted that while there are numerous sentiment corpora, these typically are derived from customer reviews and are hence not an interaction. For insight on the role of sentiment in interactions, the following publications are relevant:

Jha, V., Blaine, J. and Montague, W. (2015) Finding Value in Earnings Transcripts Data with AlphaSense. Extract-Alpha Research Note. 1-20

(Jha, Blaine and Montague 2015) found the change in tone of the speakers and how up or downbeat their current earnings call was, relative to prior earnings calls for that same company to be instructive. The level of prior tone is well known to the market, but innovations or changes in tone represent surprises relative to the market's expectations, similarly to how the level of quarterly earnings is only interesting when measured relative to past earnings or expectations.

They measured tone change as simply the current tone, minus the average tone in transcripts during the prior two years. In contrast to more modern data-driven approaches to sentiment classification (Rajwadi, et al. 2019), the authors employed simple statistical features of sentiment:

Negative words—number of positive words correlated on a per personal level and per company level across prepared and unprepared statements (Jha et al. 2015)

Ratio—total number of negative words divided by total number of words

Overall Tone–total number of positive words–total number of negative words divided by number of words (Jha et al. 2015

The research demonstrates that analysing the tone of earnings call transcripts in particular can lead to outperformance which is not captured by other common risk and return factors.

Pitch

In an earnings call study, fraudulent utterances are higher pitched (have higher relative fundamental frequency) possibly offset by the need to provide longer and more detailed utterances (Burgoon, et al. 2016). Pitch was higher and voice quality more varied during fraud-related than non-fraudulent statements. It should be noted that although a very in-depth study the sample size was limited to one company. More generally, it is claimed that guilty suspects decreased their median vocal pitch at a rate of 3.39 hz slower than innocent subjects every 2 minutes (Tower, et al. 2013). Such small differences are generally not susceptible for aural tracking during a conversation and machine tracking and analysis is required, particularly for real-time analysis. Guilty suspects also had greater correlation in their median vocal pitch with their interviewer. The median pitch of the interviewer was found to effect and increase guilty suspects' vocal pitch later in an interaction due to relevant issues to the cause being brought up later in the interview. This appears to represent a strategic attempt by guilty suspects to maintain rapport with the interviewer in order to appear credible. It should be noted that only preliminary vocalic findings are available and the results are considered tentative.

In another study, participants experiencing more cognitive dissonance spoke in a higher vocal pitch, an indicator of negative arousal (Elkins and Stone 2011). The existence of arousal was further supported by the reduction in performance, measured by response latency. Deception provoked an increment in pitch (Anolli and Ciceri 1997). The tense liar has a higher tone of voice. When lying is more difficult, the voice frequently becomes tenser, this has been observed elsewhere (Hirschberg 2008), where it was reported that both vocal tension and higher pitch positively correlated with deception.

Response Latency

Burgoon et al (Burgoon, et al. 2016) in their research noted that relative to non-fraudulent utterances, response latencies for fraud related utterances had no significant effects although response latencies for unprepared remarks in both non-fraudulent and fraudulent topics were slightly longer than for prepared remarks in the same. Non-fraudulent unscripted remarks did not have a longer response latency, as might have been expected if they were experiencing undue cognitive taxation.

Elkins and Stone (Elkins and Stone 2011) in their research noted that vocal measures of response latency (time in seconds from start of argument after stating stem) had a significant effect on high and low choice participants. Participants in high choice conditions (participants asked to lie) took nearly twice as long to respond to those in low choice conditions (participant told to lie) suggesting increased cognitive difficulty. If given a choice to lie, the participants took twice as long to respond.

Deceivers have been hypothesized to speak more than truth-tellers or to speak less (Harrison 1978, Mehrabian 1971), depending perhaps upon the care with which the lie has been prepared in advance of the telling or the desire of the deceiver to 'hold back' information. They have also been thought to exhibit more response latency or less, for similar reasons (Baskett 1974, Vrij 2000, Gozna 2004); over-rehearsed deceivers may give themselves away by answering particular questions too quickly, while under-rehearsed deceivers may need to spend more time thinking about the lie they are concocting.

More concretely, according to Buckley et al. (Buckley and Inbau 2005), the average response latency for truthful subjects is 0.5 seconds. The average latency for deceptive subjects is 1.5 seconds. Delayed responses to a straightforward question should be considered suspicious. A subject should not have to deliberate on how to respond to a question such as "Did you have sexual contact with any of your stepchildren?"

Additionally, according to Tower et al. (Tower, et al. 2013), deceivers may strategically synchronize to the interviewer in an attempt to allay suspicion. Response latency is also of particular interest in this study because it serves as an indicator of thought, doubt, or preoccupation. Pitch, vocal tension, response latency, and talking time have been found to be associated with deception, but the findings are somewhat inconsistent due to moderator variables such as motivation and whether the lie was planned or spontaneous.

Question-with-a-Question

Inbau, F. E., Reid J. E., Buckley, J. P. and Jay, B. C. (2004). Essentials of the Reid Technique—Criminal Interrogation and Confessions. Burlington: Jones and Bartlett Learning Deceptive subjects are often aware of their delayed latencies to the interviewer's questions and may attempt to disguise the delay through stalling tactics (Tower, et al. 2013). A common strategy in this regard is to repeat the interviewer's question or to ask for a simply worded question to be clarified. The subject buys time to formulate exactly how they should respond. A truthful person will not attempt to buy such time. McClish (McClish 2001) goes further by asserting that this means they are withholding some information which may be incriminating. For example, a person may be suspected of stealing money is asked, "Did you take the money?" Some deceptive responses would be, "Are you accusing me of stealing?" "You think I took the money?" "Don't you know me better than that?" In each reply, the person answered the question with a question. They cannot deny taking the money because they would be telling a lie. Therefore, they are hoping the interviewer will accept his answer/question as a denial. A secondary form of response latency involves a question that is answered with a question. An example would include: "Did you steal the money?" Answer: "Why do you think I would do that?" In this case the suspect is most likely buying time to formulate a more credible answer or "fishing" to see how much evidence/information someone actually has.

Pronouns

Smith, N. (2001) discusses the Scientific Content Analysis Technique SCAN. The SCAN technique examines a number of different parts of speech. Among the most frequently used by analysts are the use of pronouns within the text. Pronouns are words that add cohesiveness and connectivity to a text, providing back-reference as well as signalling responsibility and possession. Improper use includes omitting personal pronouns, especially 'I'. Sapir (1987) suggests that omitting the 'I' from the action weakens the assertion considerably; it demonstrates the writer's reluctance to commit to the action described. Furthermore, the technique suggests that as pronouns can also signal responsibility, the use of the word 'we' where we would expect to see 'I' shows that the writer may be trying to absolve him/herself of personal responsibility for an action.

Pronouns also indicate possession. When these pronouns are inappropriately changed or left out, the SC A N analysis would suggest that the writer may be denying ownership. The assumption being that changes in the use of pronouns and their omission within a statement highlight areas that an interviewer should probe into further.

Burns (2014) states that deceptive callers exhibited higher use of third person pronouns, with greater use of the word, "they". Deceivers used third-person plural at a higher rate, perhaps to distance themselves from an incriminating situation. However, contrary to our hypotheses, they also demonstrated more immediacy than truth tellers by using both first-person singular (the mean for truthful first-person singular=0.2964; the mean for deceptive first-person singular=1.1760) and first-person plural pronouns (the mean for truthful first-person plural=9.4136; the mean for deceptive first-person plural=10.6788).

Zhou (2004) discusses depersonalism (disassociation) manipulations—deceivers may use language to distance themselves from their messages and the contents of those messages. Nonimmediate language (described more fully below) such as lack of pronouns, especially first person pronouns, and use of passive voice reduce a sender's ownership of a statement and/or re-move the author from the action being described. Other linguistic features such as use of more second person pronouns may imply dependence on others and lack of personal responsibility.

Deceptive subjects used nonimmediate and uncertain language in the form of less self-reference and more group references.

Driscoll (1994) presents A Validity Assessment of Written statements from Suspects in Criminal investigations using the SCAN Technique. A five point weighting scale was used to score each criteria. Zero score was given in the absence in the statement of a particular criterion. +1 value was given if the individual criterion suggested truthfulness whilst +2 value was given if the individual criterion suggested a strong presence of truthfulness. −1 value suggested deception and −2 value strongly suggested deception.

Methods and techniques for the acquisition and analysis of natural language speech are well known and, whilst complex, are readily available. Such Methods and techniques are readily automated in the form of speech recognition and linguistic analysis. This can provide a written text from audio speech as well as phonetic and linguistic markers, the details of which are known in the art.

SUMMARY

The present invention is as set out in the appended claims. Additionally, in at least one exemplary embodiment:

A method comprising;
providing audio signals of an interaction between a plurality of human speakers, the speakers speaking into electronic devices to record the audio signals, the plurality of speakers comprising at least one agent speaking in a natural language and at least one subject speaking in a natural language; wherein the audio signals, which are optionally combined, comprise agent audio and subject audio; wherein the agent audio is spoken by the at least one agent and the subject audio is spoken by the at least one subject; the method automatically, and by means of computing means:
processing the audio signals to generate a speaker separated natural language transcript of the interaction from the audio signals, and being a speaker separated transcript comprising agent text which is transcribed agent audio and subject text which is transcribed subject audio;
punctuating the speaker separated transcript to provide capitalisation and/or punctuation;
identifying, from the agent text, one or more questions asked by the at least one agent;
and for each identified question:
identifying a subject response, wherein the subject response comprises; subject response text and corresponding subject response audio; wherein the subject response text comprises all the text transcribed from subject audio spoken in response to the question and the subject response audio comprises the subject audio that corresponds to the subject response text;
determining, from the agent text, whether the question asked by the at least one agent is an open question or a closed question;
identifying, from the subject response audio, one or more instances of one or more types of acoustic markers;
identifying, from the subject response text, one or more instances of one or more types of linguistic markers;
determining, using a decision engine the veracity of the subject response; using at least the question type, and the acoustic and the linguistic markers, wherein the veracity is a numerical score and comprises an indicia of the likelihood of deception in the subject response; and
flagging the subject response to a user if the indicia of the likelihood of deception in the subject response exceeds a predetermined value.

The provided combinable audio signal is a conventional frequency and amplitude signal such as obtained from a microphone input, such of a mobile phone, smart phone, telephone, headset or similar means.

The interaction between a plurality of human speakers is, for example, a telephone call, such as to an emergency response centre.

Recording the combinable audio signals is by any suitable means and serves to buffer the audio signal for improved processing.

The relevant speech is in natural language suitable for speech recognition.

Background audio, being the audio signal(s), preferably only that of the subject audio, may also be recorded. Background audio is the resultant audio obtained from gaps between speech as determined by the speech recognition function.

The method, is performed automatically, by means of computing means, any means sufficiently powerful is sufficient.

The audio signal is combinable, that is separate audio streams are preferred for clarity and to reduce overlap. In particular the audio stream of the subject audio when the agent is speaking is particularly valuable for providing background audio. However, it is also combinable, such as when two speakers share the same microphone. Specifically, determination of additional veracity cues for veracity of the subject response including laughter, expletive words, etc. is particularly valuable in this respect.

The processing the audio signal to generate a speaker separated natural language transcript of the interaction from the audio signal is obtained by using conventional speech recognition software.

Punctuating the speaker separated transcript to restore capitalisation and/or punctuation, is obtained by using conventional software such as a transformer-based model, preferably a Bidirectional Encoder Representations from Transformers (BERT) model that is operating in token classification mode and classifies each token in the ASR transcript (word) as being capitalized and/or having a question-mark, comma or full-stop following it. In addition, to deal with statements that are posed as questions, by containing a pitch inflection on the final word, an acoustic-based question Multi-Layer Perceptron (MLP) classifier is also used. The resulting linguistic (BERT Punctuator) and acoustic (MLP question classifier) are combined, the MLP uses the BERT Punctuator labelling to classify pitch inflection of final words in the utterance, and will override the BERT Punctuator's labelling of utterances if it detects the characteristic pitch infection.

Identifying a subject response for each question is based upon the presumption that the subject speech after the agent question is an answer.

Determining, from the agent text, whether the question asked by the at least one agent is an open question or a closed question is achieved by comparing the first word of the sentence with a predefined set of key words (What, When, Tell me etc.) to define each category.

Identifying, from the subject response audio, one or more instances of one or more types of acoustic markers is achieved as defined below.

Identifying, from the subject response text, one or more instances of one or more types of linguistic markers is achieved as defined below.

The determining, using a decision engine the veracity of the subject response combines the measures of using the question type, the acoustic markers and the linguistic markers. The, veracity score (also termed significance or deception score is a numerical score and is an indicia of the likelihood of deception in the subject response and as such may be used in the present invention).

The veracity of the subject response is a numerical value on an arbitrary scale calibrated by processing known outcomes from pre-existing data.

The flagging the subject response to a user if the indicia exceeds a predetermined value includes aural, visual feedback and may comprise prompts and material for further interaction.

In a first aspect, a method may comprise providing audio signals of an interaction between a plurality of human speakers, the speakers speaking into electronic devices to record the audio signals, the plurality of speakers comprising at least one agent speaking in a natural language and at least one subject speaking in a natural language. The audio signals, which are optionally combined, may comprise agent audio and subject audio; wherein the agent audio is spoken by the at least one agent and the subject audio is spoken by the at least one subject. The method may include automatically, by means of computing means, processing the audio signals to generate a speaker separated natural language transcript of the interaction from the audio signals, and being a speaker separated transcript, comprising agent text which is transcribed agent audio and subject text which is transcribed subject audio. The method may also include automatically, by means of computing means, punctuating the speaker separated transcript to provide capitalisation and/or punctuation; and identifying, from the agent text, one or more questions asked by the at least one agent. For each identified question, the computing means may identify a subject response, wherein the subject response comprises subject response text and corresponding subject response audio; wherein the subject response text comprises all the text transcribed from subject audio spoken in response to the question and the subject response audio comprises the subject audio that corresponds to the subject response text. For each identified question, the computing means may determine, from the agent text, whether the question asked by the at least one agent is an open question or a closed question; and identify, from the subject response audio, one or more instances of one or more types of acoustic markers. For each identified question, the computing means may identify, from the subject response text, one or more instances of one or more types of linguistic markers; and determine, using a decision engine, the veracity of the subject response; using at least the question type, and the acoustic and the linguistic markers, wherein the veracity is a numerical score and comprises an indicia of the likelihood of deception in the subject response. The method may also include flagging the subject response to a user if the indicia of the likelihood of deception in the subject response exceeds a predetermined value.

In a second aspect according to the first aspect, the decision engine may comprise a proximity model, wherein the decision engine uses the proximity model to compute the significance score.

In a third aspect according to the second aspect, the proximity model may compute proximity features for the one or more instances of one or more types of linguistic markers from the subject response text, wherein the proximity features represent the pattern that different linguistic markers appear in proximity to one another.

In a fourth aspect according to the third aspect, the decision engine may comprise a plurality of K-models, one for each of the types of linguistic marker, wherein the K-models use the proximity features to estimate a Deception likelihood Index, DLI, score for each type of linguistic marker, wherein the DLI scores represent the probability that the instances of a given linguistic marker type in the subject response belong to a deceptive spoken interaction.

In a fifth aspect according to the fourth aspect, the decision engine may comprise a final layer model, wherein the final layer model estimates the veracity of the subject response based on the DLI scores.

In a sixth aspect according to the fourth or fifth aspects, the model or models may be obtained from analysing a data set of a multiplicity of said audio signals, wherein each audio signal as a whole or in parts is classified as being truthful or misleading and attributes of the models are thereby derived.

In a seventh aspect according to any of the first through sixth aspects, the audio signal may be provided in real time.

In an eighth aspect according to the seventh aspect, flagging the subject response may be performed in real time and the flagging may be in the form of a notification to the agent.

In a ninth aspect according to the eighth aspect, the notification to the agent may provide the text of the subject response wherein the indicia of the likelihood of deception exceeds predetermined value.

In a tenth aspect according to the eighth or ninth aspects, the notification to the agent may provide an automatically generated question for the agent to ask the subject related to the text of the response.

In an eleventh aspect according to the tenth aspect, the automatically generated question may be generated from a pre-defined set of questions requesting confirmation of the suspect text and the questions are graded in direct proportion to the magnitude of the indicia.

In a twelfth aspect according to any of the first through eleventh aspects, the audio signal may provided as a pre-recorded audio file.

In a thirteenth aspect according to any of the first through twelfth aspects, the method may further comprise displaying the speaker separated transcript to a user, the user optionally being the agent and the display optionally being in real time.

In a fourteenth aspect according to the twelfth aspect, the method may further comprise highlighting on the displayed speaker separated transcript, any identified acoustic and/or linguistic markers.

In a fifteenth aspect according to the twelfth aspect or the thirteenth aspect, flagging the subject response to a user if the significance indicates deception may comprise highlighting the subject response text in the displayed speaker separated transcript.

In a sixteenth aspect according to the twelfth or thirteenth aspects, flagging the subject response to a user if the significance indicates deception may comprise changing the colour of the subject response text in the displayed speaker separated transcript.

In a seventeenth aspect according to any of the first through sixteenth aspects, the agent may be accepting a request for help on behalf of an emergency service and the subject is requesting that request.

In an eighteenth aspect, a computer based system may be configured to perform the method of any of the first through seventeenth aspects.

BRIEF DESCRIPTION OF THE DRAWINGS

FIG. 3 shows an example in which segments of text associated with a probability score of deception are highlighted.

FIG. 5 shows an exemplary output of a sentiment classifier.

DETAILED DESCRIPTION

Figure 1:
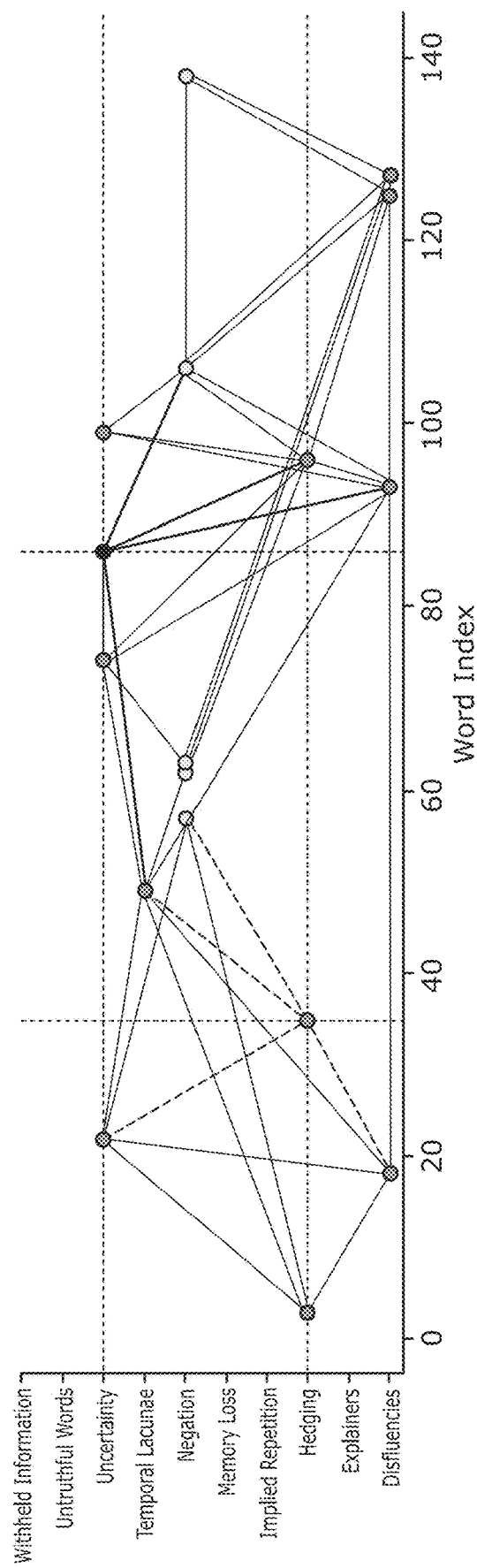
FIG. 1 shows locations of linguistic markers for an exemplary conversation.

The method of the present invention includes providing an audio signal of an interaction between a plurality of speakers, the plurality of speakers comprising at least one agent and at least one subject. The audio signal comprises agent audio and subject audio; wherein the agent audio is spoken by the at least one agent and the subject audio is spoken by the at least one subject.

The audio signal is preferably provided in real time, the benefit of this being that the invention may provide continuous assessment of the interaction and therefore may provide information about the deceptive nature of the at least one subject's answers to the at least one agent's questions as the interaction is progressing. Specifically, automation allows the benefits usually obtained by the human user from hindsight to be provided to the user in real time by the automated method and system applying it, of the present invention.

This information may be fed back to the at least one agent and would allow the at least one agent to dynamically adapt the questions they ask within the interaction. The agent is accepting a request for help is preferably doing so on behalf of an emergency service and the subject is requesting that request. This greatly assists in time and resource pressured environment where human cognitive capacity is often exceeded and where attempted deception is reality.

In a confidential test, 56 real-world insurance contact centre First Notification of Loss (FNOL) calls from two different financial institutions were selected to test the capability of the system. These were historical calls with known outcomes as regards to whether fraud was proven or not. The calls comprised 24 Non-Fraud, and 32 Fraud calls. The calls were processed through the system of the present invention and 72% of the calls were correctly classified as fraud (0.76 F1 Score).

Continuous assessment of the interaction of the method of the invention is best implemented using real-time capable deep learning components with little latency. The latency of the deep learning components is preferably less than three seconds. Continuous assessment of the interaction provides for the possibility of the agent to adapt their role in the interaction based on the feedback from the system.

Hence, preferably the flagging the subject response is in real time and the flagging is in the form of a notification to the agent.

The notification to the agent may provide the text of the subject response wherein the indicia of the likelihood of deception exceeds predetermined value. This serves to alert the user mind set to concentrate on likely indicators of deception and so speed up their response.

As such the notification to the agent may provide an automatically generated question for the agent to ask the subject related to the text of the response. The automatically generated question may be generated from a pre-defined set of questions requesting confirmation of the suspect text and the questions are graded in direct proportion to the magnitude of the indicia.

Alternatively, the audio signal may be provided as a provided as a pre-recorded audio file. In this case the audio signal is provided as a recording of the entire interaction and the interaction is assessed post-interaction. The interaction is evaluated in a passive way using batch processing methods after the interaction has occurred. Evaluating the interaction post interaction is preferable in the cases where no real time assessment of the interaction is required. It is also useful for training agents who can experiment and use examples from their experience. Batch processing is more efficient and requires less computing power than the online approach required by the real time assessment.

The method further includes generating a speaker separated transcript of the interaction from the audio signal. The agent audio is any audio signal that relates to utterances spoken by the at least one agent and the subject audio is any audio signal that relates to utterances spoken by the spoken by the at least one subject. The speaker separated transcript comprises agent text which is the transcribed agent audio and subject text which is the transcribed subject audio. This uses known speech recognition and parsing techniques.

Utterances may be a plurality of sentences, a sentence, a question or a partial sentence if a complete sentence is not provided or single words/verbal sounds.

The speaker separated transcript may be generated through the use of automatic speech recognition and either channel separation or diarization technology. It is preferred that the system used to record the interaction separates the audio channels belonging to agent and subject. The use of channel separation in this way enables the labelling of each speaker's utterance in in the speaker separated transcript. Channel separation is more accurate than diarization and is preferred.

If channel separation is used, following the channel separation, an Automatic Speech Recognition (ASR) system transcribes the channel separated audio to create the speaker separated transcript.

If channel separation is not possible due to, for example, limitations in the audio recording devices used to provide the audio signal, combined audio signal is first transcribed and then a diarization algorithm separates the transcription into agent text and subject text.

In the case of Post-processing the Automatic Speech Recognition software can be batch processing code, but in the case of Online-processing (real-time processing), it will be Streaming ASR that produces words incrementally for a live audio stream.

The method of the present invention further includes punctuating the speaker separated transcript to restore capitalisation and/or punctuation. This is preferably done using a transformer-based model such as a Bidirectional Encoder Representations from Transformers (BERT) model operating in a token classification mode. The model receives a text sequence and is required to predict each word in the sentence with a type of entity. Here, the entities correspond to capitalisation and punctuation (comma, full-stop and question mark). Using BERT a punctuation model can be trained where a pre-trained BERT model (BERT_base) is used for better language representation. The Huggingface transform library was used for the implementation of the model. The BERT for token classification model was then fine-tuned for punctuation restoration using the Tatoeba Dataset. The dataset contains 1,002,667 sentences where each word in a sentence is labelled for capitalisation and punctuation. The model was trained on 90% of the dataset and tested on 10%. A test accuracy of 99.93% and an F1-Score of 0.91 was achieved. As can be seen from these test results the BERT punctuation model is very accurate at restoring punctuation and identifying questions for the purposes of establishing context. However, with regard to rhetorical questions and questions that linguistically look like statements it is not as accurate. An example of a question that looks like a statement linguistically is:

'and that's the reason for the delay'

In a spoken interaction, a pitch increase on the word 'delay' turns the seeming statement into a question 'and that's the reason for the delay?'. The BERT punctuator does not correctly recognise this as a question as it does not consider acoustic pitch data. To address this issue (and optionally related issues) the system also contains an acoustic-based question classifier. The acoustic-based classifier is a Multi-Layer Perceptron (MLP) with two hidden layers trained on 2000 Tatoeba audio files, and it achieves a significant capability at being able to identify questions based on acoustic pitch features (F1-Score=0.73) on the test set. The Acoustic Question Classifier sits downstream of the BERT punctuation model in the invention and uses the mark-up of ASR and subsequent BERT token labelling to override the BERT punctuator in instances where utterances are identified as statements when examination of the pitch information on the final word in the utterance (the word before the full stop as identified by the BERT punctuator) is classified as being an inflection by the acoustic question classifier. In testing, the additional use of the acoustic question classifier has demonstrated an increased accuracy and reduction in false positives in terms of question detection.

For each of the one or more questions asked by the at least one agent the method of the present invention further comprises: identifying, a subject response, wherein the subject response comprises; subject response text and subject response audio; wherein the subject response text comprises all the text transcribed from subject audio spoken in response to the question and the subject response audio comprises the subject audio that corresponds to the subject response text. Each question has an associated subject response. For each of the one or more questions asked by the at least one agent the method of the present invention further comprises: determining, from the agent text, whether the question asked by the at least one agent is an open question or a closed question. This is done using an additional text classifier. The additional text classifier is preferably a transformer-based model such as a BERT model Closed questions motivate short responses, a short response being five words or less. Examples of closed questions are: What is your name? What colour was the paint you spilled on the carpet? These questions can be answered in 5 words or less. Open questions motivate long responses, a long response being six or more words. An example of an open question is: Can you tell me what happened? The response to this type of question typically requires more than 6 words. The method may further include identifying the questions and their type in the speaker separated transcript Whether a question is an open question or a closed question is defined as the "question context" of a question.

For each of the one or more questions asked by the at least one agent the method of the present invention further comprises identifying, from the subject response audio, one or more instances of one or more types of acoustic markers and identifying, from the subject response text, one or more instances of one or more types of linguistic markers. The identified acoustic and/or linguistic markers may be tagged in the speaker separated transcript. Tagging the markers in the speaker separated transcript allows for the speaker separated transcript to be displayed to the user with the markers highlighted with in it.

Further, automatically identifying the markers has been found to help combat fatigue in the user/agent.

For each of the one or more questions asked by the at least one agent the method of the present invention further comprises: determining, using a decision engine, the significance of the subject response. The decision engine uses at least the question type, the acoustic markers and the linguistic markers to determine the significance of the subject response. The significance is a numerical score and is an indicator of how likely it is that the subject is being deceptive based on the markers present in the subject response. The significance is normalised so that it is a probability score, taking values between 0 and 1, where 0 indicates zero probability of deception and 1 indicates that the subject is certainly being deceptive. The significance may also be referred to as the deception score.

For each of the one or more questions asked by the at least one agent, the method of the present invention further comprises flagging the subject response to a user if the significance indicates deception. Whether the significance indicates deception is determined by whether the significance exceeds a predetermined value.

The decision engine may comprise a proximity model 220. The decision engine may use the proximity model 220 to compute the significance score 270. The classical approach (NeurIPS ref) uses the counts of all linguistic markers as a feature vector to classify deception. However, this approach requires the input text to be approximately the same length and this approach also ignores the order in which linguistic markers appear. To overcome this issue, this invention advocates the use of a new set of features termed proximity features 230. Proximity features 230 represent the pattern that different linguistic markers appear in proximity to one another. For each instance of a marker that appears at location t, the proximity model 220 extracts the distance and direction of the nearest occurrence of all the markers as proximity feature 230 for given instant. The distance between two instances of markers that occur at t1, and t2 (word index as location) is defined as $d=|t_1-t_2|$ and direction is positive (for $t_1>t_2$) or negative (for $t_1<t_2$). The proximity feature extraction is described as follows;

Consider there are K linguistic markers $M_1, M_2 \ldots M_K$. For each marker $M_i$, a set of locations (word index) of marker instant $T_i$ can be defined as:

$$M_i \rightarrow T_i := \{t | \forall t \text{ location of marker } M_i\}$$

The sets of the locations of markers included in this invention are such that: $T_i \cap T_j = \emptyset$ for $i \neq j$ and $T_i \cap T_j = T_i \cup T_j = T_i$ for $i=j$. A location set $T_i$ can be the Empty set, if no instance of marker i appeared in the given text. Similarly, the length of the location set $N_{T_i} = |T_i|$ is the total number of instances that appeared for marker i.

From the given location sets $T_1, T_2 \ldots T_K$ for K markers, the location of the nth instance of marker i is $t_n$ (i.e. $t_n \epsilon T_i$), then a proximity feature vector $PF_{i,n}$ for $t_n$ can be defined as:

$$PF_{i,n}(k) = T_k[j] - t_n \text{ for } j = \arg\min(|T_k - t_n|) \text{ if } k \neq i \text{ and } T_k \neq \emptyset \quad (1)$$

$$PF_{i,n}(k) = T'_i[j] - t_n \text{ for } j = \arg\min(|T'_i - t_n|) \text{ if } k = i \text{ and } T'_i \neq \emptyset \quad (2)$$

$$PF_{i,n}(k) = \infty \text{ for } T_k = \emptyset \quad (3)$$

Where $T'_i = T_i \backslash \{t_n\}$ is a location set of marker i excluding element $t_n$ and $k=1, 2, \ldots, K$ thus $PF_{i,n} \epsilon \mathbb{R}^K$. In the case of the empty set of location ($T_k = \emptyset$), the distance to the nearest marker is set to $PF_{i,n} = \infty$, which indicates that the marker is present but is far away. In the implemented system this far away value is set to some higher value, such as the total length of the input text.

To illustrate the above computation, the locations of linguistic markers for an example conversation are shown in FIG. 1. On the x-axis the location of marker instant (trigger term location) and on the y-axis, 10 linguistic markers. It can be seen that a few markers are absent in the conversation. Looking into an instance of Hedging, around word location 38, the nearest instance of all the markers are shown with connected dark solid lines, including nearest Hedging instant. Similarly, connected lines for an instance of Uncertainty are shown in dark solid lines. Using the above approach, the proximity model 220 obtains a set of K proximity features $PF_1, PF_2, \ldots, PF_K$, one for each marker and dimension of each $PF_i$ is ($|T_i|$, K) i.e. $PF_i \epsilon \mathbb{R}^{|T_i| \times K}$. Additionally, the proximity model 220 normalises the proximity feature using the function $\eta_\alpha(.)$. The objective of the normalization function is to accommodate two important characteristics, the effect of markers fading away exponentially with distance, and to map value in the range $[-1,1]$ or $[0,1]$.

The normalization function $\eta_\alpha(.)$ Uses the hyperbolic tangent function and the Gaussian function to map distant values, as defined by:

$$\eta_\alpha(d) = \tan h(ad) \text{ where } \alpha = \tan h^{-1}(1-tol)/d_{max}(\tan h) \quad (4)$$

$$\eta_\alpha(d) = e^{-\left(\frac{d}{\alpha}\right)^2}$$

where $\alpha = (-d_{max}^2/\log(tol))^{1/2}$ (Gauss) \quad (5)

Where the values of tol and $d_{max}$ sets the proximity range, such that any distance value above $d_{max}$ will be mapped to a value less than tol for the Gaussian normalization function and greater than 1-tol for the hyperbolic tangent normalization. Using the hyperbolic tangent function tan h for normalization maps distant values into the range $[-1, 1]$ and retains the direction of the distance. On the other hand, using the Gaussian normalization function maps the distance values into the $[0,1]$ range and loses the direction.

Figure 2:
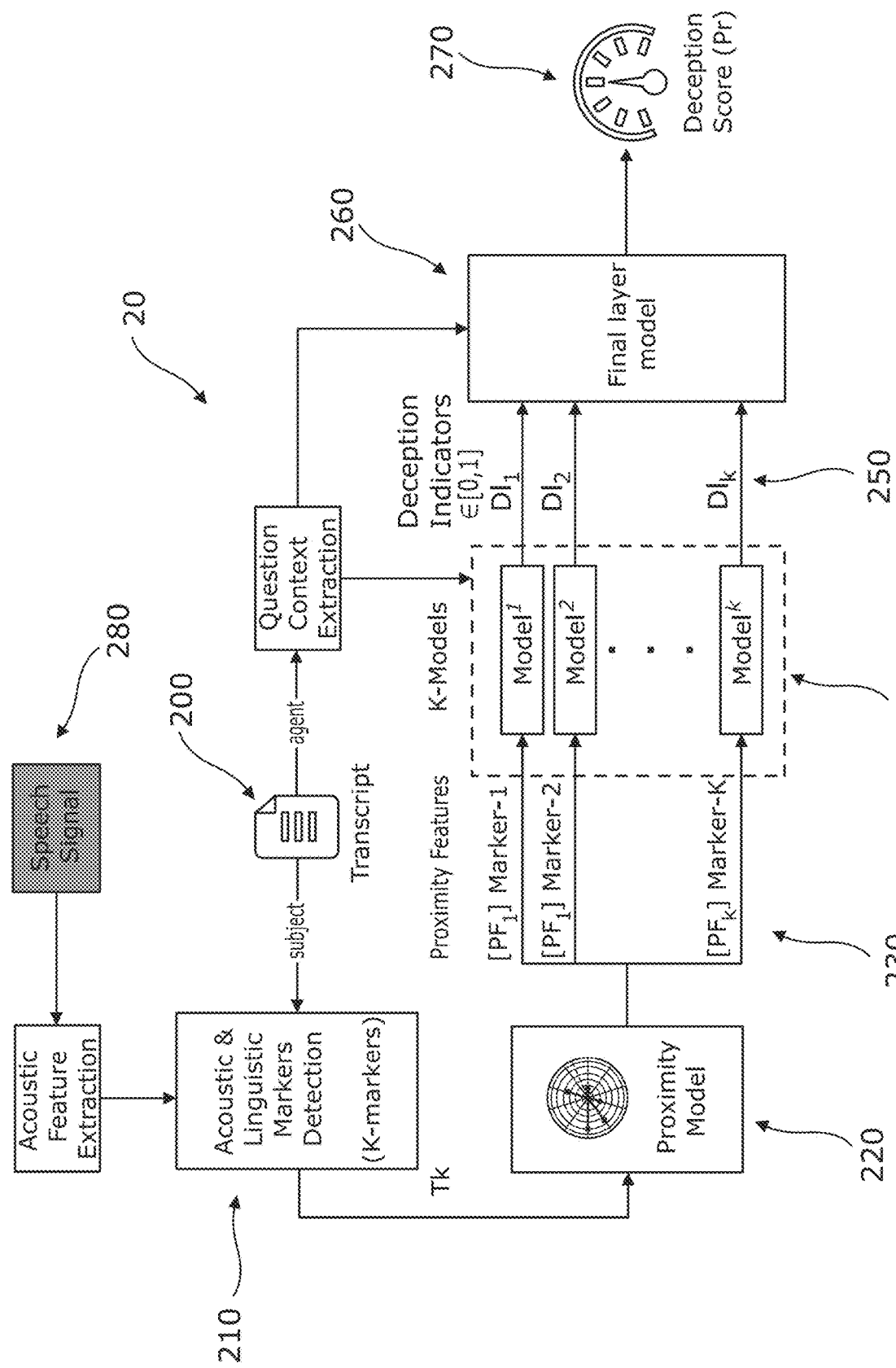
FIG. 2 shows an exemplary architecture of a decision engine.

The decision engine 20 comprises at least the following 5 processes:
(a) Acoustic and Linguistic Marker Detection
(b) Proximity Feature Extraction
(c) Question Context Extraction
(d) K-Models
(e) Final layer model The architecture of the decision engine 20 is shown in FIG. 2. A speech signal 280 of the spoken interaction is processed to extract acoustic features. The extracted acoustic features and the subject text of a transcript 200 of the spoken interaction are processed by the linguistic and acoustic marker models 210, from this, location sets indicating the trigger words and phrases for K marker models are extracted. From these location sets, the sets of normalized proximity features 230 are computed using equations (4) and (5). There are K-models 240, one for each of the acoustic and linguistic markers, which are designed to estimate the probability for an instance of a marker belonging to a deceptive spoken interaction based on the proximity features 230 of that instance. For each instance of the markers i, Model-i produces a probability score of the extent to which this instance belongs to a deceptive subject response. These scores of all the instants for a conversation are aggregated (with mean average) to produce Deception Likelihood Index of ith marker ($DLI_i$). The K-Models therefore produce K—DLI scores 250, which are used by Final Layer model 260, to estimate the probability 270 of whole subject response being deceptive or not. The choice of classifiers for K-models and Final Layer model includes the combination of XGBoost and SVM. In addition, a polynomial feature generator for both may be implemented.

The agent text of the transcript 200 is processed to extract the question context of the questions asked by the agent. Question Context input to one or both of the K-models and the final layer. It is a binary variable indicative of whether the agent's question is closed or open. Closed questions should have responses characterised by short responses indicative of lower expected cognitive load. If the response features significant hesitation and disfluency the Decision Engine will pick up on this. For open question context, subject responses are usually characterised by more cognitive load and hence sensitivity around certain markers like Response Latency and Disfluency may be reduced by the Decision Engine.

In application domains where agent's ask scripted questions to subjects, for example when they make insurance claims, question context can be established simply by comparing the agents' questions to the list of scripted questions using a similarity metric like Levenshtein distance. In this scenario, since we know the questions the agent will ask in advance, we know also the question context, and can label question utterances with the appropriate binary marker.

Question context can be a BERT-based sentence classifier that has been fine-tuned from the BERT_base language model with thousands of examples of open and closed questions. The transcript has been processed by BERT token classification-based punctuation restoration and acoustic question classification. The BERT Question Context Extraction then classifies any questions in the agent's utterances as open or closed questions.

Question Context is a binary class label is then used as an additional input to the K-Models and/or as an input to the final layer model to weight the significance of co-occurring marker events in the Decision Engine, effectively modelling the subjects expected response and subsequent classification of deception.

For training the K-models and final layer, the CSC behavioural corpus and a real-world financial services dataset collected from two insurance companies may be used. From these datasets, first the responses of the interviewees are cleaned and the linguistic markers with respective location sets are extracted. From the location sets ($T_i$), proximity features $PF_i$ are extracted using tan h normalization (Equation 4) with tol=0:001 and $d_{max}$=500. For training the ith model from the K-Models (preferably 10 K-models) all the proximity feature set $PF_i$ from deceptive conversation (labelled with Lie or Fraud—different labels from the Financial Services and CSC datasets), are merged together as one class—Deceptive, and the proximity feature set $PF_i$ from the non-deceptive conversation (labelled with True or non-fraud), are merged together as a class—Non-Deceptive. For training the Final Layer, the scores of all the instants of markers are aggregated for a spoken interaction to produce DLI scores, which are used as feature vector to train the Final Layer. For K-Models and the Final Layer, different combinations of XGBoost, SVM and Logistic Regression are tuned to achieve best results.

To evaluate the performance of the above approach on both datasets the Accuracy, F1-Score and a score $TPR_{F0}$ (True Positive Rate) may be computed by setting the probability threshold such that False Positive Rate becomes zero. $TPR_{F0}$ is defined as $$TPR_{F0} = \frac{1}{|C_1|} \sum_{x \in C_1} Pr(x > thresh) \quad (6)$$

such that $$\Sigma_{x \in C_0} Pr(x > thresh) = 0 \quad (7)$$

Where Pr(x) is a probability score estimated by the Decision Engine for example x. $C_1$ is a set of all examples belonging to Fraud/Lie and $C_0$ is a set of all examples belonging to the Non-fraud/Truth class. $|C_1|$ is the length of the set i.e. the total number of examples in class 1 (Fraud/Lie). The score $TPR_{F0}$ is an important criterion for applying deception detection. It makes it possible to observe if there exists a threshold on the probability score of the trained model which produces no false positives (false alarms), erroneous predictions of deception. This threshold may used by the present invention as the predetermined value above which the deception score is considered to indicate deception. $TPR_{F0}$ allows the avoidance of false accusation, dealing with the most sensitive cases first.

Example domains, and the use of the present invention within said domains are:
- Sales—for the purpose of steering a sales interaction, ensuring potential clients' questions are accurately answered
- Interview—to evaluate the performance of both the interviewer and the candidate, and to provide explainable feedback to the candidate for the purpose of coaching them
- Insurance claims—In many instances of the insurance claim process, but in particular in the first notification of loss (FNOL) part of the claim process. Here claimants are making the insurance claim for the first time. Analysis of these initial claims is more effective as fraudulent claimants are less prepared.
- Mental health—particularly of contact centre agents
- Hoax calls—similar to fraudulent claims, in calls to emergency services the interaction between the operator (Police, Fire, Ambulance etc.) and the caller when reporting an actual or hoax incident that can be mined to determine the credibility of the caller.

The K-models and final layer models are preferably trained using datasets specific to the domain that invention is to be used in.

One of the unique attributes of the invention is that it can be used to locate the elements of deception in a spoken conversation with probability score. As per the design, by using proximity features, each model from K-models is trained for a given instance of each marker to estimate the probability score that it belongs to a deceptive conversation. Since proximity features compute the nearest distance of each marker only, it is possible to extract the proximity feature of an instance of a marker from only a window of a communication. For example, given an instant of a marker (say Negation), only 50 words before and 50 words after it, can be utilised to extract proximity feature for Negation, which can be used by the model trained of Negation to estimate the probability of the given instance belonging to a deceptive speech or not. With a similar approach, for a short communication transcript, the aggregated probability score ($DLI_i$) from all K-models can be computed and finally, a deception score from Final Layer can be computed. This approach is suitable to apply on a real-time communication to generate the deception score on accumulated responses and observe the variation of score with visualization to further investigate. An example for such approach is shown in FIG. 3 by highlighting the segment of text with probability score of deception (deception score). The darker highlight represents higher probability and the lighter represents lower probability score of deception.

From FIG. 3, it can be observed that the deception score around 3rd last line (highlighted text segment that starts with—'I don't have specific knowledge . . . '), is the highest, which indicates that this highlighted response is the most likely deceptive. This can be verified from the linguistic point of view by observing the occurrence of Negation, Hedging and Uncertainty around this utterance. Looking into the first line, the combination of disfluencies (mhm, um), Negation (no) and uncertainty (I think) contribute to this assessment.

The method of the present invention may further comprise displaying the speaker separated transcript to a user.

The method of the present invention may further comprise highlighting, on the displayed speaker separated transcript, the identified acoustic and/or linguistic markers. This may be done in real time or post interaction.

In the real time case, the audio signal will be played to the user as it is spoken by the one or more agents and one or more subjects and the speaker separated transcript will be generated and displayed in real time using the methods described above.

In the post processing case, the audio signal is played back to the user from a recording and the speaker separated transcript is displayed in time to the audio signal. This may be achieved by embedding the audio into the speaker separated transcript to create a smart transcript like the one shown in: Cornelius Glackin, Nazim Dugan, Nigel Cannings, and Julie Wall. 2019. Smart Transcription. Proceedings of the 31st European Conference on Cognitive Ergonomics. Association for Computing Machinery, New York, N.Y., USA, 134-137. DOI:https://doi.org/10.1145/3335082.333511. The smart transcript may be modified such that any identified acoustic and/or linguistic markers are highlighted in the transcript.

The step of flagging the subject responses to a user if the significance of the subject response indicates deception may include highlighting the subject response text or changing the colour of the subject response text if the decision engine determines that the significance of the subject response indicted that the subject was deceptive when providing said subject response.

The step of flagging the subject responses to a user if the significance of the subject response indicates deception is preferably used in real time and automatically presented in pauses in speech so as to maximise user concentration.

The step of flagging the subject response to a user may include displaying the significance of the subject response to a user.

The step of flagging the subject responses to a user if the significance of the subject response indicates deception, as it may be deemed offensive may be presented as an icon, such as of a face the length of nose on the face being in proportional to the magnitude of the indicia and is more readily assimilated than a number.

Displaying the speaker separated transcript to a user may be done using a diagnostic user interface. The diagnostic user interface may display the speaker separated transcript in time to playback of the interaction.

It is not always useful to display the mark-up from all the different marker models at once. The Diagnostic user interface therefore may also allow the user to select which types of markers are to be highlighted in the speaker separated transcript. This may be done using checkboxes which allow a user to select and deselect different marker types to be highlighted in the speaker separated transcript. Each marker type may be highlighted in the speaker separated transcript with a different colour.

The Diagnostic user interface may also allow the user to select a marker type, then scroll through the instances of that marker type in the speaker separated transcript.

The step of flagging to a user, the subject responses if the significance indicates deception may be done using the diagnostic user interface. If the decision engine determines the significance of a subject response to indicate that the subject was being deceptive when giving said subject response, the diagnostic user interface may mark (flag) the subject response as deceptive. This may be done by changing the colour of the text of the subject response in the speaker separated transcript, highlighting the entire text of the subject response in the speaker separated transcript or displaying words/a symbol adjacent to the text of the subject response in the speaker separated transcript.

If a subject response is flagged as deceptive, the diagnostic user interface may indicate to the user why the response was flagged. Hence, the present invention may additionally provide explainable decision support via the diagnostic user interface. For example, in the case of the following example interaction:

Agent: 'What colour was the paint spilled on the carpet?'
Subject: 'Err, um, blue I think . . . '

The present invention may display the following: "the system has flagged this response as deceptive. It did so because the question was a closed question and the response displayed two disfluency markers and a memory loss marker".

A portion of the subject audio may be created in which the natural language component is removed and the remaining background audio compared to a database of sound signatures to provide a background matching score. The background matching score may further be provided to a user in the same manner as claimed in any preceding for the indicia of the likelihood of deception.

The background matching score and the indicia of the likelihood of deception may be combined when flagging the subject response to the user.

The sound signatures include at least one of; the sound of burning wood, the sound of an emergency siren, the sound of gunfire, and the sound of screaming.

Acoustic and Linguistic Markers

Acoustic markers and linguistic markers are features present in Human speech that may indicate deception. In the present invention, it is the acoustic and linguistic markers present in the subject response that are considered by the decision engine when determining if the subject is likely to be being deceptive in their response.

It should be noted that the presence of an acoustic or linguistic marker in the subject response in its self does not indicate deception, but the number of and types of marker in a subject response may be analysed using the decision engine to determine the significance of the subject response.

Acoustic Markers

Acoustic markers are features of human speech that relate to how the speech is spoken.

Acoustic markers can be identified from recorded human speech as they can be identified from an audio spectrum. In the present invention, acoustic markers are identified from the subject response audio. Wherein the audio signal is of natural language spoken by a human.

The types of acoustic marker considered by the present invention may be one or both of unusual pitch and unusual response latency.

Unusual Response Latency

Response latency is the time it takes for a person to respond to a question. Response latency serves as an indicator of thought, doubt or preoccupation. The response latency of a subject response will depend on whether or not the subject is lying, and if they are lying, the response latency will depend to some extent how well rehearsed the lie is; over-rehearsed deceivers may give themselves away by answering certain questions too quickly while under-rehearsed deceivers may experience cognitive load and require more time to answer a question. The marker of unusual response latency indicates that a person took either less time or more time than expected to respond.

In the present invention, the acoustic marker of unusual response latency may therefore be identified from the subject response audio by: Identifying the response latency of the subject response, wherein the response latency of the subject response is time between an agent finishing speaking a question and a subject beginning the response; Comparing this response latency to a baseline time range for response latency; and, if the response latency of the subject response is outside of the baseline time range, determining that unusual response latency is present. The present invention will then add a tag to subject response in the subject response text to indicate the presence of the unusual response latency marker.

The baseline time range is preferably between 0.5 and 1.5 seconds, with response latencies outside of this range indicating an increased likelihood of deception. If the response latency of the subject response is less than 0.5 seconds or greater than 1.5 seconds the present invention will add a tag to subject response in the subject response text to indicate the presence of the unusual response latency marker.

Identifying the response latency of the subject response may be achieved by determining the time between an agent finishing speaking and a subject beginning their response.

When identifying response latency of a subject response, if the interaction between agent and subject is remote, for example via phone or online, the present invention may also take into account the time delay due to the geographical separation of the agent and subject before determining response latency.

Unusual Pitch

Pitch is a function of the speed of the vibration of the vocal chords during speech production. A high pitch sound corresponds to a high frequency sound wave measured in Hz, the number of sound pressure level vibrations per second. In telephony, the usable voice frequency band ranges from approximately 300 to 3400 Hz. The voiced speech of a typical adult male will have a fundamental frequency from 85 to 180 Hz, and that of a typical adult female from 165 to 255 Hz. Children of 6 and 10 years have a fundamental frequency across tasks for the boys of approximately 262 Hz, and for girls approximately 281 Hz. For the present invention a high pitch is a relative measure.

When determining the whether the subject response has unusual pitch, the present invention uses one or more of: overall pitch, pitch variance, pitch slope, median vocal pitch and pitch correlation.

The overall pitch of a subject response is the average fundamental frequency of the entirety of the audio spoken by the subject in the subject response. The overall pitch of a subject response may indicate the presence of unusual pitch if the overall pitch of the subject response is higher pitched than the average overall pitch of the responses given by a given subject. Higher pitch in a subject response is indicative of deception.

The pitch variance is the frequency with which the fundamental frequency of the subject response audio changes. Pre-prepared, i.e. deceptive, subject responses are more likely to have more frequent changes in pitch levels.

In the present invention, pitch variance is a measure of the spread of the different pitch values within an utterance and is determined by finding the averages of the squared differences from the mean pitch value.

The pitch slope is the direction in which the fundamental frequency of the subject response audio is changing, i.e. is the fundamental frequency increasing or decreasing over the duration of the subject response. Pre-prepared, i.e. deceptive, subject responses are more likely to exhibit a decrease in pitch across the duration of the subject response. The median vocal pitch is defined as the central pitch value or average of the central pair of pitch values in an ordered set of pitch values within the utterance.

The pitch correlation is the extent to which the pitch of the subject response matches the pitch of the question that it is in response to.

Linguistic Markers

A linguistic marker is a feature of human speech which related to what is said. Linguistic markers are identified from the subject response text as they relate to features which may be extracted from a textual transcript, wherein the textual transcript is transcribed from an audio signal of natural language spoken by a human.

The types of linguistic marker considered by the present invention may be any combination of disfluencies, explainers, pronouns, hedging, repetition, implied repetition, memory loss, negation, temporal lacunae, uncertainty, withheld information, sentiment and question-with-a-question.

Disfluencies

Disfluencies are an impairment of the ability to produce smooth fluent speech, characterised by utterances such as 'Um, Er, Ah, Uh-huh, pardon etc.'. Disfluencies are indicative of increased cognitive load. Disfluencies are therefore a good indicator of deception when they occur in the context of closed questions as the subject should not have to think hard about the answer. Whereas disfluencies with regards to open questions are not necessarily suspicious, it is not unreasonable for someone recounting a chain of events to have some disfluencies in their utterances.

In the present invention, disfluencies are identified within the subject response text using a using a bag of words model. The Disfluencies bag of words model matches words from the subject response text to words listed in a 'bag of words' that contains all the disfluency words considered by the present invention. Examples of disfluency words are 'Um', 'Err', 'Ah', 'Pardon'. If a word is determined from the subject response text matches a word in the bag of words that contains a list of all the disfluency words considered by the present invention, then the present invention identifies that a disfluency is present. The present invention then adds a tag to the matched word in the subject response text to indicate the presence of the disfluency marker.

An example of an interaction in which the present invention would detect the presence of the disfluency marker in the subject response is as follows:

Agent: 'What colour was the paint spilled on the carpet?'
Subject: 'Err, um, blue I think . . . '

The present invention, using the method described above would add a tag to 'Err' and a tag to 'um' in the subject response text to indicate the presence of two instances of the disfluency marker.

Repetition

Repetitions are repeated words or phrases and are possible indicators of deceptive parts of an interaction.

In the present invention, identifying repeated words and phrases in an interaction is done by searching for all possible words and phrases and tallying the number of appearances of each word or phrase. This is done with brute force techniques that search for every combination of word and phrase. The limit of the number of words in a phrase may be seven words. This ensures that repetition can be identified fast enough to operate in an online capacity at real-time speed.

Implied Repetition

Implied repetition is when the subject alludes to having said something previously. This can be indicative of deception as it indicates the subject may be attempting to persuade, to be believed and to convince rather than conveying information.

In the present invention, Implied repetition is identified within the subject response text using a using a bag of words model. The implied repetition bag of words model matches words and or phrases from the subject response text to words and or phrases listed in a 'bag of words' that contains all the implied repetition words and phrases considered by the present invention. Examples of implied repetition words and phrases are 'Again', 'As I already mentioned', 'As I said previously'. If a word or phrase from the subject response text is determined to match a word or phrase in the bag of words that contains a list of all the implied repetition words and phrases considered by the present invention, then the present invention identifies that implied repetition is present. The present invention then adds a tag to the matched word or phrase in the subject response text to indicate the presence of the implied repetition marker.

An example of an interaction in which the present invention would detect the presence of the implied repetition marker in the subject response is as follows:

Agent: ' How do you see the next quarters trade figures developing?' Subject: 'As I said previously, the figures are about where we expect them to be . . . '

The present invention, using the method described above would add tag to 'As I said previously' in the subject response text to indicate the presence of the implied repetition marker.

Memory Loss

The memory loss marker is present when the subject asserts that they do not remember something. A lack of memory about an incident demonstrates a lack of commitment on the part of the subject and signals the possibility of deception.

In the present invention, memory loss is identified within the subject response text using a using a bag of words model. The memory loss bag of words model matches words and or phrases from the subject response text to words and or phrases listed in a 'bag of words' that contains all the memory loss words and phrases considered by the present invention. Examples of memory loss words and phrases are 'I can't really remember', 'I forget', 'I don't recall'. If a word or phrase from the subject response text is determined to match a word or phrase in the bag of words that contains a list of all the memory loss words and phrases considered by the present invention, then the present invention identifies that memory loss is present. The present invention then adds a tag to the matched word or phrase in the subject response text to indicate the presence of the memory loss marker.

An example of an interaction in which the present invention would detect the presence of the memory loss marker in the subject response is as follows:

Agent: 'Tell me everything that happened'
Subject: 'It was a while ago now. I can't really remember'

The present invention, using the method described above would add tag to 'I can't really remember' in the subject response text to indicate the presence of the memory loss marker.

Negation

The Negation marker indicates that the subject has reported something in the negative, i.e. the subject is telling the agent that something that didn't happen or isn't the case. Time in life is marked by events that happened. When a subject tells an agent what didn't happen, what wasn't said or what wasn't thought without being asked, this is an indicator of deception.

In the present invention, negation is identified within the subject response text using a using a bag of words model. The negation bag of words model matches words and or phrases from the subject response text to words and or phrases listed in a 'bag of words' that contains all the negation words and phrases considered by the present invention. Examples of negation words and phrases are 'I didn't, 'I could not', 'I didn't see', 'I wasn't', 'I didn't think'. If a word or phrase from the subject response text is determined to match a word or phrase in the bag of words that contains a list of all the negation words and phrases considered by the present invention, then the present invention identifies that negation is present. The present invention then adds a tag to the matched word or phrase in the subject response text to indicate the presence of the negation marker.

An example of an interaction in which the present invention would detect the presence of the negation marker in the subject response is as follows:

Agent: ' What did you see?'
Subject: 'I was in the house; I didn't see anyone run across the garden. I wasn't thinking about going outside at that time of night'

The present invention, using the method described above would add tag to 'I didn't' and add a tag to 'I wasn't' in the subject response text to indicate the presence of two instances of the negation marker.

Temporal Lacunae

The temporal lacunae marker indicates that the subject has skipped over something in their response. Temporal lacunae are a signal that the brain is thinking about what happened during a timespan but skips over it and therefore can indicate deception through intended removal of important information.

In the present invention, temporal lacunae is identified within the subject response text using a using a bag of words model. The temporal lacunae bag of words model matches words and or phrases from the subject response text to words and or phrases listed in a 'bag of words' that contains all the temporal lacunae words and phrases considered by the present invention. Examples of temporal lacunae words and phrases are 'the next thing I know', 'later on', 'all of a sudden'. If a word or phrase from the subject response text is determined to match a word or phrase in the bag of words that contains a list of all the temporal lacunae words and phrases considered by the present invention, then the present invention identifies that temporal lacunae is present. The present invention then adds a tag to the matched word or phrase in the subject response text to indicate the presence of the temporal lacunae marker.

An example of an interaction in which the present invention would detect the presence of the temporal lacunae marker in the subject response is as follows:

Agent: ' What happened next?'
Subject: 'I got in just after 10 pm. I watched some tv. The next thing I know is I'm lying on the floor and the place is on fire'

The present invention, using the method described above would add tag to 'the next thing I know' in the subject response text to indicate the presence of the temporal lacunae marker.

Withheld Information

The Withheld Information marker is identified when words and phrases that often accompany parts of the spoken interaction indicative of a person withholding information are present in the subject response. These words and phrases are used to gloss over potentially important facts or bridge gaps in fabricated events, and hence identifying them points to parts of the spoken interaction where there are gaps in the narrative.

In the present invention, withheld information is identified within the subject response text using a using a bag of words model. The withheld information bag of words model matches words and or phrases from the subject response text to words and or phrases listed in a 'bag of words' that contains all the withheld information words and phrases considered by the present invention. Examples of withheld information words and phrases are 'generally', 'in the main', 'literally', 'loosely', 'on the whole', 'speaking broadly', 'to a (certain) degree'. If a word or phrase from the subject response text is determined to match a word or phrase in the bag of words that contains a list of all the withheld information words and phrases considered by the present invention, then the present invention identifies that withheld information is present. The present invention then adds a tag to the matched word or phrase in the subject response text to indicate the presence of the withheld information marker.

Withheld information can manifest in a number of different ways, from the simple, "Let me think, I went to the garage, the bank and I withdrew some money. I had a coffee and went to work." We'd consider how much time passed between withdrawing some money and having a coffee? Was it a couple of minutes, half an hour, an hour etc? If someone says the same and adds the word "then" so the sentence now reads, "Let me think, I went to the garage, the bank and I withdrew some money. Then I had a coffee and went to work." This is a linguistic signal of withheld information. This means the person is thinking of the time between withdrawing the money and having a coffee. This causes the subject to pause in the chronological order and is due to something which may have happened, was thought or said at this specific time.

An example of an interaction in which the present invention would detect the presence of the withheld information marker in the subject response is as follows:

Agent: Your friend has confirmed that he withdrew the money with your permission.

Subject: Well, everything he said is basically a lie"

This indicates that there is some truth in what the friend has confirmed.

Agent: Tell me what happened

Subject: What happened was my wife generally handles the bills, especially when I'm at work so I can't understand how the payments weren't made"

The Subject tells us what his wife "generally" did as opposed to what she did.

Agent: Does that cover everything?

Subject: That's literally/loosely it./That's about it in the main/on the whole. Question with a Question The question with a question marker is present when the subject answers the agent's question with another question. This may be a form of verbal response latency where the subject seeks to allow for thinking time in which to answer the question, this could be indicative of deception. It may also indicate that the subject hasn't heard the question correctly.

In the present invention, the question with a question marker is identified by determining whether there is a question mark in the subject response text. This is possible as the speaker separated transcript is has been punctuated. If there is a question mark in the subject response text, the present invention then adds a tag to the question in the subject response text to indicate the presence of the question with a question marker.

In the present invention, the question with a question marker is identified by determining whether there is a question mark in the punctuated text as identified by the BERT Punctuator and confirmed by the acoustic question classifier which classifies the acoustic pitch data samples on the final word of the sentence. In this way, BERT punctuator segments the linguistic data into sentences by placing full-stops, commas and question marks, and this provides the question classifier with the timing of words from which it can extract pitch values and classify to infer whether a question occurred acoustically as well as linguistically.

An example of an interaction in which the present invention would detect the presence of the question with a question marker in the subject response is as follows:

Agent: ' How come you're so late?'

Subject: 'I got held up in traffic. Why do you ask?'

Here the BERT punctuator adds the ? at the end of the agent's utterance, and the question classifier confirms this by classifying the pitch values for the word 'late' as being a question. For the subject's response, the word traffic (before the BERT punctuator's full stop) is not classified as a question by the question classifier, but the pitch values associated with the word 'ask' in the next sentence is confirmed as a question.

Once this question classification has taken place, identification of questions from the subject in response to questions from the agent are straight-forward to identify.

Pronouns

Pronouns are words that can function as nouns and refer to either the participants in the discourse (e.g. I, you) or someone/something mentioned elsewhere in the discourse (e.g. she, it). Empirical evidence suggests deceivers use pronouns differently to truth-tellers.

The areas of sensitivity to be identified include:

Omission (Missing)—pronouns are dropped/less self-reference demonstrating a lack of commitment (Home Office 2001, Zhou 2004)

e.g. 'Woke up at 7.00. Had a shower. Made breakfast and read the newspaper. At 8.30, drove to work.' In this statement, pronouns aren't used. The person making the statement had not said who woke up, who made breakfast etc. The missing I indicates tension and a lack of commitment to the statement.

Improper Use of Pronouns—for example switching to third person pronouns in an attempt to absolve personal responsibility. (Home Office 2001) This is also referred to as disassociation manipulations by Zhou et al. (2004)

e.g. 'We should have done a better job.' Another way of avoiding responsibility for actions is to share the blame using pronouns such as 'we' and 'us.' It is also noted as to which point in the narrative that these change. In a reporting of a mugging or an attack, there should be distancing language after the event with no use of the pronoun 'we' to describe the assailant and the victim.

Higher rates of third person plural pronouns—featured more commonly in order to distance oneself from an incriminating situation (Burns & Moffitt. 2009, Zhou 2004) e.g. 'That's their way of doing things.' 'You'd better ask them.'

In the present invention, the presence of the pronouns marker is determined using a model designed to implement the Scientific Content Analysis Technique SCAN.

An example of an interaction in which the present invention would detect the presence of the pronouns marker in the subject response is as follows:

Agent: 'Can you tell me what happened?'
Subject: 'Got up, got dressed, left the house, drove to the shop, parked outside, went in to buy cigarettes, came out and the car was gone'

The subject response is sensitive as the pronouns are omitted, which points to distancing language, instead of saying 'I got up, I got dressed, I left the house . . . ' the subject is unconsciously distancing themselves from what they are saying. The detection of missing pronouns can be done with a language model such as BERT_base. BERT is primarily a language model in that it has learned the syntactic relationships between words in a data-driven way, using large volumes of text from the entirety of Wikipedia (2,500 million words) and the Book Corpus (800 million words). BERT is trained with a masking approach to make it robust in which 15% of the words in each training sequence are replaced with a [MASK] token. The model then attempts to predict the original value of the masked words, based on the context provided by the other, non-masked, words in the sequence. This invention makes use of this BERT training procedure to find missing pronouns from the pretrained BERT_base language model. In our subject response above, a [MASK] token is systematically placed between each word in the sequence one at a time and BERT is asked to hypothesise what the missing word is. When the [MASK] token is placed before the 'Got up, . . . ' part of the sequence: '[CLS] [MASK] Got up, got dressed, left the house, drove to the shop, parked outside, went in to buy cigarettes, came out and the car was gone [SEP]'

BERT suggested that the masked word was 'I'. Similarly, when the [MASK] token is placed before 'got', 'left', 'drove', 'parked', and 'went', BERT suggested a masked (missing) 'I'. By systematically sliding the [MASK] token over the sequence and asking BERT to infer the masked word the missing pronouns and their probability of being missing at the location of the [MASK] token can be found, effectively discerning the absence of pronouns.

Explainers

Explainers are words used to explain why something has occurred. The presence of explainers in a subject response can indicate deception as it indicates that the subject is seeking to explain as opposed to report (to convince rather than convey).

In the present invention, Explainers are identified within the subject response text using a using a BERT Multi-task Deep Neural Network classifier model. This architecture allows the model to be fine-tuned on various text classification tasks and also enables the deployment of the model in a more rational environment with limited GPU resources. The Multi Head BERT's architecture uses shared transformer layers from BERT for feature representation which is then passed through the various task specific Neural Networks attached at the end of the BERT MTDNN for respective task-specific classifications. In the current invention these tasks may include Hedging, Explainers, Memory-Loss and Sentiment.

Figure 4:
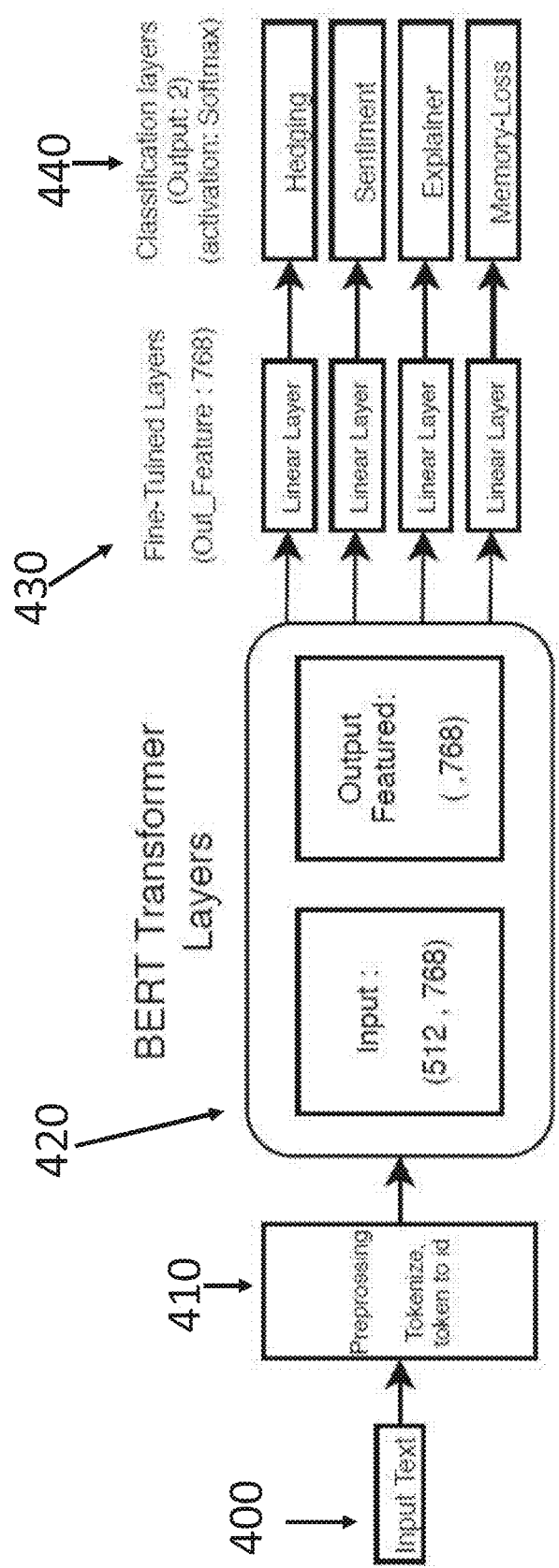
FIG. 4 shows an exemplary BERT architecture.

FIG. 4 shows the Multi-Head BERT architecture where the input text 400 is pre-processed into tokens and converted into token-ids through the BERT tokenizer 410. For BERT compatible representation, each token is converted into 768 dimension vector having 512 as the max token length. The BERT Transformer layers 420 are shared across all tasks while the end layers 430 are task-specific. These task-specific layers 430 generate task-specific representations followed by a final classification layer 440 for scoring. The Multi-task BERT model was trained and tested on CDLM datasets to detect various linguistic markers identified by linguistic experts to be highly impactful in detecting deception in textual data. The linguistic markers comprise Hedging, Explainer and Memory-loss. An extra head was added for sentiment classification included as one of the linguistic marker, Stratford Sentiment Treebank-2 (SST-2) dataset [19] was used for training the sentiment head. Multi-Head BERT was trained simultaneously on all four of the linguistic markers mentioned above.

An example of an interaction in which the present invention would detect the presence of the Explainers marker in the subject response is as follows:

Agent: 'Tell me what happened?'
Subject: 'I had breakfast, I put everything away and I took the children to school. On the way back, I went to the shop because I had to get some paracetamol as we'd ran out. I headed home, I spoke to some friends on the way and I got back at 9:30 am.'

The present invention, using the method described above would add tag to 'because' and 'as' in the subject response text to indicate the presence of the Explainers marker.

Hedging

The hedging marker is present when the subject uses hedging terms. Hedging terms indicate a lack of conviction to a described version of events. There are many different ways in which language can be 'hedged'. These include using modal verbs such as 'may' and 'might', using modal nouns such as 'probability' and 'assumption', using lexical verbs which denote a sense of caution i.e. 'assume' and 'indicate' and by using expressions which show a sense of caution or vagueness, i.e. 'it can be argued that' or 'it is likely to be the case that'. The use of hedging in a statement indicates increased cognitive load, ambiguity, lack of commitment and therefore potential deception.

In the present invention, the hedging marker is identified using a rules based model. A rules-based approach is required to determine if a term is a hedging term based on its use in context.

In the present invention, hedging is identified by first using part of speech tagging to label words in every sentence of the subject response with their grammatical word categories as part-of-speech tags such as verbs, noun, adjectives, adverbs etc. Part-Of-Speech (POS) tagging is a prerequisite for dependency parsing as an incorrect POS tag propagates errors in dependency parsing.

The present invention then uses dependency parsing to generate, for each sentence, a dependency parse tree of a sentence which represents its' syntactic structure. The dependency parse tree defines the relationship between head words and words in the sentence, it identifies the words that modify the head word. In linguistics, the head word in a sentence determines the syntactic category of that sentence.

Next the present invention identifies any hedging entities in the subject response using a Named Entity Recogniser pipeline (NER). NER is an information extraction technique used to identify and classify generic entity mentions in text, such as names of persons, locations, organisations, monetary values, time, etc. It is also an effective approach for identifying multi-word expressions in text. This is particularly important when identifying hedging, as phrases like 'to a greater extent' should always be considered together in a hedge detection task. The present invention may use a custom NER built using Spacy's natural language processing library 'EntityRuler' to extend the dictionary of hedge entities as new entities in the pipeline in order to facilitate their identification in a text. The present invention implements NER using the BIO (IOB inside outside beginning) tagging scheme.

The present invention then uses a decision tree model to determine whether the hedging entities identified by the named entity recogniser are hedging terms. The decision tree model includes a decision tree for every hedging entity considered by the present invention. The decision tree is used to determine whether a hedging entity is a hedging term (and therefore the presence of the hedging marker) by considering the term its self, based on the syntactic features derived by the dependency parser and based on the part of speech tags.

Hedging terms such as 'about', 'maybe', and 'assume' are only considered hedging under certain linguistic conditions. For example, the term, About, can be used as Hedging as in—'I went there about same time', but is in fact not a hedging term when used in a sentence like: 'Let's talk about your new school'. For this reason, the decision tree for the hedging entity "about" may dictate that hedging entity "about" is considered to be a hedging term if only if the head word is associated with a part of speech tag that indicates that it is a number (NUM) or an adverb (ADV).

If the decision tree outputs that the hedging entity is a hedge term, the present invention adds a tag to the hedging entity in the subject response text to indicate the presence of the hedging marker.

The decision tree model may be a trained decision tree model. Decision Trees may be used for two markers, Hedging and Explainers.

For building a decision tree to detect if a sentence is Hedging or not, syntactic features related to the trigger term present in the given sentence are extracted using dependency parsing. Dependency parsing generates a tree for a given sentence reflecting the relationship between words. The syntactic features are the Part-Of-Speech (POS) tags of different elements, relatives and neighbours of trigger term in the sentence. The relatives and neighbours include, Head, children, siblings, ancestors and ±4 neighbours (words either side of the trigger term). An absence of any element was encoded as −1. The Decision Tree classifier, were trained for different trigger terms, with 70-30 split of dataset.

An example of an interaction in which the present invention would detect the presence of the hedging marker in the subject response is as follows:

Agent: 'When did you arrive at home?'
Subject: 'I arrived at about the same time as my wife . . . '

The present invention, using the method described above would add tag to 'assumed' in the subject response text to indicate the presence of the hedging marker.

Sentiment

In the present invention, the marker of sentiment may be identified using a 1 dimensional Convolutional Neural Network 1D-CNN architecture such as the one disclosed in Rajwadi, Marvin & Glackin, Cornelius & Cannings, Nigel & Wall, Julie & Moniri, Mansour. (2019). Study of Deconvolution Approaches for Text/Image AI Explainability that was used for sentiment classification using textual data. The architecture comprises 3 blocks of 1D Convolutional and MaxPooling layer connected to 2 blocks of Fully Connected and dropout layer. The input layer of the architecture is an embedding layer where the input sequence is mapped into vector space. The input sequence is generated by assigning each word in a sentence a unique number based on the occurrence rate of the corresponding word in the data vocabulary this process is called tokenization. The output layer of the model is a sigmoid activation function which generates a fuzzy sentiment score. The sentiment score is a number between 0 and 1, the distance of the score from 0 and 1 indicated the sentiment of the input, 1 being highly positive and 0 being highly negative, neutral sentiment occurs at values near 0.5. The model was implemented using TensorFlow keras layers and GloVe pretrained word embedding was used to tokenize the input sentence. 1-D CNN is a lightweight architecture containing fewer parameters making it efficient and viable for real time inferencing. 1-Dimensional CNN has proven to be faster and resource efficient that the traditional recurrent neural network architecture (RNN). An example output with the 1D-CNN sentiment classifier is shown in FIG. 5. In FIG. 5 the darker the red highlight, the more negative the sentiment of the highlighted word or phrase. The darker the blue highlight, the more positive the sentiment of the highlighted word or phrase. In FIG. 5, red highlights are represented with relatively heavier lines, while blue highlights being represented with relatively lighter lines. Darker highlights (either red or blue) are represented by lines having fewer breaks, with solid lines representing the darkest highlight.

FIG. 5 shows the deconvolution at work on a few chosen reviews 500 with their corresponding sentiment 510, (a) and (b) are simple reviews that contradict each-other with (a) being highly positive and (b) highly negative. These two examples demonstrate the ability of the 1D CNN to learn the context that the words are within, in (a) 'absolutely' is positive because of its relationship with 'brilliant', but in (b) 'absolutely' is negative because of the negative context of the rest of the sentence. (c) shows negation in a sentence, and illustrates that the model is looking at the sentence as a whole and not simply attributing sentiment to individual words. (d) is a positive sentence but with strong negative words like 'hate' and However, the model overlooks those words and focuses on the overall sentiment of the sentence predicting it as positive. This text example is the only one specifically written as an antagonistic attempt to test the model, all the other reviews are taken from the IMDB test set. Similar behaviour can be observed in (e) where the overall negativity of the sentence is overwhelmed by the positive phrase 'quite visually impressive'. (f) is the most negative out of all reviews, here the model demonstrates its ability to learn from the data. The IMDB dataset includes the rating of the movie: and the user's review includes '2 out of 10', which shares the same negativity as the word 'worst' within the sentence. Similar to this review (i) which is positive and the model predicts it not just because of the positive words but also because it has learned the significance of the numerical rating '11 stars'. In (g) it is difficult for a human to determine whether the review is positive or negative and this is reflected rightly in the model's neutral classification. (h) on the other hand, is rightly classified as a highly positive review, despite some undermining negative phrases. Similarly, in (j) a positive review is correctly predicted despite some negative words that have been correctly put in the context of the sentence.

Uncertainty

The linguistic marker of uncertainty indicates the presence of equivocation terms. Equivocation terms are defined as terms that may reveal uncertainty through the avoidance of a definitive answer. That is, subjects who precede what they say with words such as 'maybe' or 'kind of' are not fully committed to their accounts and therefore might be being deceptive.

Uncertainty can be found in any number of either individually or as a collective in Hedging, Lack of Memory or negation. In the present invention, the uncertainty marker is identified using the pre-trained BERT (base uncased version) fine-tuned it on the CoNLL BioScope dataset to predict uncertainty of a sentence. This is done for every sentence of the subject response text. With using only 30% of the data of the CoNLL BioScope dataset for training, the BERT model was able to achieve a higher accuracy compared to a 1-D CNN trained using 70% of the data. In the present invention, BERT may be implemented using FastAI, HuggingFace, PyTorch and Tensorflow libraries. Fine-tuning the pre-trained BERT on the CoNLL BioScope dataset achieves substantial accuracy improvement over the pre-trained BERT alone.

If the uncertainty marker is identified, the present invention then adds a tag to uncertain feature of the subject response text to indicate the presence of the uncertainty marker.

An example of an interaction in which the present invention would detect the presence of the uncertainty in the subject response is as follows:

Agent: 'I need that completed by Friday. Will it be completed by then?'

Subject: ' I should hope so. I don't foresee any problems, so I would say by this Friday if my memory serves me well. At least in all likelihood.'

The present invention, using the method described above would add tag to 'I should hope so', 'I would say', 'If my memory' and 'in all likelihood' in the subject response text to indicate the presence of the uncertainty marker.

The present invention uses BERT to detect uncertainty because BERT uses Transformer with attention allowing it to learn relationship of words with each other in the context of the text. Traditionally Transformers include two separate mechanisms an encoder and decoder. Encoder reads the text input and squeezes the input data into Encoder Vector which encapsulates the important information. The decoder then takes the encoder vector as input and constructs the input with features that matters the most to make the reconstructed input to match the initial input.

In the present invention, the attention mechanism is the most important and useful feature of the BERT architecture as it addresses the problem of how far back in the data the model can look for context relationship. Attention takes two sentences and turns them into matrix where word of sentence A makes the column and words of sentence B makes the rows. The rows and columns undergo a matching process to identify relevant context or relation between sentence A and B. This is highly useful in machine translation tasks where sequence length of sentence A and B is not always equal. However, attention can also be used using the sentence with itself in order to understand how some parts of the sentence relate to others which is called self-attention.

An Example of the Use of the Present Invention

An Example interaction may be an interaction in the context of a telephone call to make an insurance claim, wherein the agent is a call centre operative and the subject is a caller calling to make a first notification of loss insurance claim. In this example, the call centre operative is also the user and therefore the present invention displays to the operative the markers that have been identified in the subject responses and also flags to the operative any responses for which the veracity of the subject response as computed by the decision engine indicates that the caller is being deceptive.

The Example interaction may progress as follows:

The operative asks questions for the purpose of discovering information about the claim and to establish the credibility of the caller.

A call recorder of the telephony system separates the audio channels belonging to the operative and caller. Downstream of this channel separation, an Automatic Speech Recognition (ASR) system transcribes the audio in real-time as it is spoken. The channel separation in-turn enables the labelling of each speaker's utterance in in the ASR transcription.

The speaker separated transcript is then punctuated to restore capitalization, and punctuation. In this example, the speaker one of the questions and subject responses in the separated transcript may be as follows:

Operative: What was the name of the jewellers you purchased from?

Caller: What was the name of the jewellers? God you know what mate, I have no, I could not tell you mate, Gods honest truth, I could not tell you the name of the jewellers. I could tell you where it is I know exactly where it is.

The speaker separated transcript may be displayed to the operative.

The present invention will then identify that the question is a closed question.

The present invention will then identify acoustic and linguistic markers in the subject response text. In this case, the question with a question marker will be identified due to the repetition of the question by the caller, the presence of two instances of the negation marker due to the two instances of the phrase "I could not" and the presence of the repetition marker due to the two instances of the phrase "I could not tell you". The text associated with the identified markers may be highlighted the speaker separated transcript if the speaker separated transcript is displayed to the operative. The decision engine will then determine the significance of the subject response. In this case, the significance will be above exceed a predetermined value, and the present invention will flag the subject response to the operative, indicating that the caller is likely to be being deceptive.

Background Audio

As previously described the audio not containing speech is particularly useful in supplementing the determination of the indicia of the likelihood of deception. This audio is that from a combined signal and most preferably from subject audio when not combined (or kept separate from) agent audio. The background audio is more preferably the audio from when the agent is speaking to the subject. The agent in a non-assisted environment has reduced capability to process this information when speaking themselves. The background audio may be background audio signal from subject audio from which any (passed back) agent audio is subtracted.

In the present invention, a portion of the subject audio is created in which the natural language component is removed and the remaining background audio compared to a database of sound signatures to provide a background matching score, the background matching score may be provided to a user in the same manner as for the indicia of the likelihood of deception.

The background matching score and the indicia of the likelihood of deception may be additively combined when determining the veracity of the subject response.

The background audio is compared to database of sound signatures having an associated score as regards a type of event and the nature of the event. The nature of the event is preferably correlated to a database of sets of words associated for that event to obtain a list of what are termed synonyms. The method preferably checks the subject transcript for matched to these words and if a match is found the background matching score is increased by a multiplier.

The sound signatures database may include at least one of; the sound of burning wood, the sound of an emergency siren, the sound of gunfire, and the sound of screaming.

An example nature of the event for the burning wood sound would be 'fire' and the set of words for associated for that event could be 'fire', 'inferno', 'heat', 'blazing' etc. A match of the subject transcript mentioning fire would then be combined with the synonym 'fire' and the background matching score doubled.

Whilst a human user may be able to use such features to some extent, automated processing is far more precise and can, for example, differentiate between burning fuel or burning wood, between different types of sirens and alarms etc. The database can therefore provide a portfolio of information beyond the knowledge and ability of any given human user.

What is claimed is:

1. A computer-implemented method comprising:
   providing audio signals of an interaction between a plurality of human speakers, the speakers speaking into electronic devices to record the audio signals, the plurality of speakers comprising at least one agent speaking in a natural language and at least one subject speaking in a natural language; wherein the audio signals comprise agent audio and subject audio; wherein the agent audio is spoken by the at least one agent and the subject audio is spoken by the at least one subject;
   processing the audio signals to generate a speaker separated natural language transcript of the interaction from the audio signals, the speaker separated transcript comprising agent text which is transcribed agent audio and subject text which is transcribed subject audio;
   punctuating the speaker separated transcript to provide capitalisation and/or punctuation;
   identifying, from the agent text, one or more questions asked by the at least one agent;
   and for each identified question:
      identifying a subject response, wherein the subject response comprises subject response text and corresponding subject response audio; wherein the subject response text comprises text transcribed from subject audio spoken in response to the question and the subject response audio comprises the subject audio that corresponds to the subject response text;
      determining, from the agent text, a question context of the question asked by the at least one agent, wherein the question context is whether the question is an open question or a closed question;
      identifying, from the subject response audio, one or more instances of one or more types of acoustic markers;
      identifying, from the subject response text, one or more instances of one or more types of linguistic markers; and
      determining, using a decision engine, veracity of the subject response using at least the question context and the acoustic and the linguistic markers, wherein the veracity is a numerical score and comprises an indicia of a likelihood of deception in the subject response; and
   flagging the subject response to a user if the indicia of the likelihood of deception in the subject response exceeds a predetermined value,
   wherein the decision engine comprises a proximity model, wherein the decision engine uses the proximity model to compute the numerical score,
   wherein the proximity model computes proximity features for the one or more instances of one or more types of linguistic markers from the subject response text, wherein the proximity features represent a pattern that different linguistic markers appear in proximity to one another, and
   wherein the decision engine comprises a plurality of K-models, one for each type of linguistic marker, wherein the K-models use the proximity features to estimate a Deception likelihood Index (DLI) score for each type of linguistic marker, wherein the DLI scores represent a probability that the instances of a given linguistic marker type in the subject response belong to a deceptive spoken interaction.

2. The method of claim 1, wherein the decision engine comprises a final layer model, wherein the final layer model estimates the veracity of the subject response based on the DLI scores.

3. The method of claim 1, wherein the proximity model and/or the K-models are obtained from analysing a data set of a multiplicity of said audio signals, wherein each audio signal as a whole or in parts is classified as being truthful or misleading and attributes of the proximity model and/or the K-models are thereby derived.

4. The method of claim 1, wherein the audio signal is provided in real time.

5. The method of claim 4, wherein the flagging the subject response is in real time and the flagging is in the form of a notification to the agent.

6. The method of claim 5, wherein the notification to the agent provides the subject response text when the indicia of the likelihood of deception exceeds predetermined value.

7. The method of claim 5, wherein the notification to the agent provides an automatically generated question for the agent to ask the subject related to the subject response text.

8. The method of claim 7, wherein the automatically generated question is generated from a pre-defined set of questions requesting confirmation of the subject response text and the questions are graded in direct proportion to a magnitude of the indicia.

9. The method of claim 1, wherein the audio signal is provided as a pre-recorded audio file.

10. The method of claim 1, further comprising displaying the speaker separated transcript to a user.

11. The method of claim 10, further comprising highlighting on the displayed speaker separated transcript, any identified acoustic and/or linguistic markers.

12. The method of claim 10, wherein flagging the subject response to a user if the indicia of the likelihood of deception in the subject response exceeds a predetermined value comprises:
   highlighting the subject response text in the displayed speaker separated transcript.

13. The method of claim 10, wherein flagging the subject response to a user if the indicia of the likelihood of deception in the subject response exceeds a predetermined value comprises:
   changing the colour of the subject response text in the displayed speaker separated transcript.

14. The method of claim 1, wherein the agent is accepting a request for help on behalf of an emergency service and the subject is requesting that request.

15. A computer based system configured to perform the method of claim 1.

16. A computer-implemented method comprising:
   receiving audio signals indicative of an interaction between a plurality of human speakers from one or more electronic devices, the plurality of speakers comprising at least one agent speaking in a natural language and at least one subject speaking in a natural language, wherein the audio signals comprise agent audio and subject audio;
   processing the audio signals to generate a speaker separated transcript of the interaction from the audio signals, the speaker separated transcript comprising agent text which is transcribed from the agent audio and subject text which is transcribed from the subject audio;
   identifying, from the agent text, one or more questions asked by the at least one agent;
   identifying, in response to identifying the one or more questions, a subject response, wherein the subject response comprises subject response text and corresponding subject response audio and the subject response text comprises text transcribed from the subject audio;
   identifying, from the subject response audio, one or more instances of one or more types of acoustic markers;
   identifying, from the subject response text, one or more instances of one or more types of linguistic markers;
   determining, using a decision engine, veracity of the subject response using at least a question context and the acoustic and the linguistic markers, wherein the veracity is a numerical score and comprises an indicia of a likelihood of deception in the subject response;
   determining a value of a likelihood of deception in the subject response using the acoustic and the linguistic markers; and
   generating a notification to a user when the value of the likelihood of deception in the subject response exceeds a predetermined value,
   wherein the decision engine comprises a proximity model, wherein the decision engine uses the proximity model to compute the numerical score,
   wherein the proximity model computes proximity features for the one or more types of linguistic markers from the subject response text, wherein the proximity features represent a pattern that different linguistic markers appear in proximity to one another, and
   wherein the decision engine comprises a plurality of K-models, one for each of the types of linguistic marker, wherein the K-models use the proximity features to estimate a Deception likelihood Index (DLI) score for each type of linguistic marker, wherein the DLI scores represent a probability that a given linguistic marker type in the subject response belong to a deceptive spoken interaction.

17. A computer-implemented method comprising:
   providing audio signals of an interaction between a plurality of human speakers, the speakers speaking into electronic devices to record the audio signals, the plurality of speakers comprising at least one agent speaking in a natural language and at least one subject speaking in a natural language; wherein the audio signals comprise agent audio and subject audio; wherein the agent audio is spoken by the at least one agent and the subject audio is spoken by the at least one subject;
   processing the audio signals to generate a speaker separated natural language transcript of the interaction from the audio signals, the speaker separated transcript comprising agent text which is transcribed agent audio and subject text which is transcribed subject audio;
   punctuating the speaker separated transcript to provide capitalisation and/or punctuation;
   identifying, from the agent text, one or more questions asked by the at least one agent;
   and for each identified question:
      identifying a subject response, wherein the subject response comprises subject response text and corresponding subject response audio; wherein the subject response text comprises text transcribed from subject audio spoken in response to the question and the subject response audio comprises the subject audio that corresponds to the subject response text;
      determining, from the agent text, a question context of the question asked by the at least one agent, wherein the question context is whether the question is an open question or a closed question;
      identifying, from the subject response audio, one or more instances of one or more types of acoustic markers;
      identifying, from the subject response text, one or more instances of one or more types of linguistic markers; and
      determining, using a decision engine, veracity of the subject response using at least the question context and the acoustic and the linguistic markers, wherein the veracity is a numerical score and comprises an indicia of a likelihood of deception in the subject response; and
   flagging the subject response to a user if the indicia of the likelihood of deception in the subject response exceeds a predetermined value,
   wherein the audio signal is provided in real time,
   wherein the flagging the subject response is in real time and the flagging is in the form of a notification to the agent,
   wherein the notification to the agent provides an automatically generated question for the agent to ask the subject related to the subject response text, and
   wherein the automatically generated question is generated from a pre-defined set of questions requesting confirmation of the subject response text and the questions are graded in direct proportion to a magnitude of the indicia.

* * * * *